(12) United States Patent
Takeuchi

(10) Patent No.: US 8,766,763 B2
(45) Date of Patent: Jul. 1, 2014

(54) FUNCTION CONTROL METHOD USING BOUNDARY DEFINITION, FUNCTION CONTROL SYSTEM USING BOUNDARY DEFINITION, FUNCTION CONTROL SERVER USING BOUNDARY DEFINITION AND PROGRAM

(75) Inventor: Yuichiro Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 938 days.

(21) Appl. No.: 12/683,209

(22) Filed: Jan. 6, 2010

(65) Prior Publication Data

US 2010/0171585 A1 Jul. 8, 2010

(30) Foreign Application Priority Data

Jan. 6, 2009 (JP) ................. P2009-001153
Jan. 6, 2009 (JP) ................. P2009-001154
Mar. 30, 2009 (JP) ................. P2009-083101

(51) Int. Cl.
*G05B 23/02* (2006.01)
(52) U.S. Cl.
USPC ............................... 340/3.1; 340/674
(58) Field of Classification Search
USPC ............. 340/573.4, 539.11, 426.11, 426.12, 340/825.69, 311.2, 7.21; 455/404.1, 435
See application file for complete search history.

(56) References Cited

U.S. PATENT DOCUMENTS

| | | | | |
|---|---|---|---|---|
| 4,814,751 A | * | 3/1989 | Hawkins et al. | 340/573.1 |
| 5,819,016 A | * | 10/1998 | Watanabe et al. | 345/419 |
| 6,054,923 A | * | 4/2000 | Prather et al. | 340/568.5 |
| 6,163,683 A | * | 12/2000 | Dunn et al. | 455/151.1 |
| 6,167,046 A | * | 12/2000 | Terada et al. | 370/389 |
| 6,232,916 B1 | * | 5/2001 | Grillo et al. | 342/357.4 |
| 6,369,710 B1 | * | 4/2002 | Poticny et al. | 340/572.1 |
| 6,441,823 B1 | * | 8/2002 | Ananya | 345/442 |
| 6,597,380 B1 | * | 7/2003 | Wang et al. | 715/782 |
| 6,774,782 B2 | * | 8/2004 | Runyon et al. | 340/505 |
| 6,812,881 B1 | * | 11/2004 | Mullaly et al. | 341/176 |
| 6,963,277 B2 | * | 11/2005 | Imasaki et al. | 340/539.1 |
| 7,096,120 B2 | * | 8/2006 | Hull | 701/433 |
| 7,277,692 B1 | * | 10/2007 | Jones et al. | 455/412.1 |
| 7,443,298 B2 | * | 10/2008 | Cole et al. | 340/572.4 |

(Continued)

FOREIGN PATENT DOCUMENTS

| | | |
|---|---|---|
| JP | 2001-009156 | 1/2001 |
| JP | 2005-341092 | 12/2005 |

(Continued)

OTHER PUBLICATIONS

Rekimoto, J. et al., "CyberCode: Designing Augmented Reality Environments with Visual Tags", in Proc. of DARE2000, 10 pages, (2000).

(Continued)

*Primary Examiner* — Jennifer Mehmood
*Assistant Examiner* — Rufus Point
(74) *Attorney, Agent, or Firm* — Finnegan, Henderson, Farabow, Garrett & Dunner, L.L.P.

(57) ABSTRACT

A function control method using boundary definition of present invention includes the steps of, setting a boundary line to virtually partition a given physical space, and controlling a predetermined function of an electronic appliance based on at least one or all of a position of the boundary line, and a shape and a size of a closed loop formed by the boundary line.

17 Claims, 21 Drawing Sheets

(56) References Cited

U.S. PATENT DOCUMENTS

| | | | |
|---|---|---|---|
| 7,545,267 B2* | 6/2009 | Stortoni | 340/539.26 |
| 7,962,280 B2* | 6/2011 | Kindo et al. | 701/439 |
| 8,103,447 B2* | 1/2012 | Kindo et al. | 701/439 |
| 8,280,398 B2* | 10/2012 | Ishii et al. | 455/456.1 |
| 8,284,069 B2* | 10/2012 | Sverrisson | 340/686.1 |
| 8,311,675 B2* | 11/2012 | Parlantzas et al. | 700/253 |
| 2002/0173940 A1* | 11/2002 | Thacker et al. | 703/5 |
| 2003/0009394 A1* | 1/2003 | Malkin et al. | 705/27 |
| 2003/0018534 A1* | 1/2003 | Zack et al. | 705/22 |
| 2004/0193368 A1* | 9/2004 | Sanqunetti | 701/207 |
| 2005/0123171 A1* | 6/2005 | Kobayashi et al. | 382/103 |
| 2005/0253713 A1* | 11/2005 | Yokota | 340/566 |
| 2006/0014547 A1* | 1/2006 | Walter | 455/456.1 |
| 2006/0133612 A1* | 6/2006 | Abedi et al. | 380/270 |
| 2006/0135121 A1* | 6/2006 | Abedi et al. | 455/410 |
| 2006/0220785 A1* | 10/2006 | Ferdman | 340/5.61 |
| 2007/0171091 A1* | 7/2007 | Nisenboim et al. | 340/825.69 |
| 2007/0173265 A1* | 7/2007 | Gum | 455/456.1 |
| 2007/0191025 A1* | 8/2007 | McBrierty et al. | 455/456.2 |
| 2007/0268138 A1* | 11/2007 | Chung et al. | 340/572.1 |
| 2009/0153307 A1* | 6/2009 | Kim et al. | 340/10.41 |
| 2009/0270101 A1* | 10/2009 | Seki | 455/435.2 |
| 2010/0164720 A1* | 7/2010 | Kore | 340/541 |
| 2010/0228602 A1* | 9/2010 | Gilvar et al. | 705/10 |
| 2011/0087431 A1* | 4/2011 | Gupta et al. | 701/207 |
| 2011/0242134 A1* | 10/2011 | Miller et al. | 345/633 |

FOREIGN PATENT DOCUMENTS

| | | |
|---|---|---|
| JP | 2005-346507 | 12/2005 |
| JP | 2006-93792 | 4/2006 |
| JP | 2006-339937 | 12/2006 |

OTHER PUBLICATIONS

Cotting, D. et al., "Interactive Environment-Aware Display Bubbles", *UIST '06*, pp. 245-254, (2006).

* cited by examiner

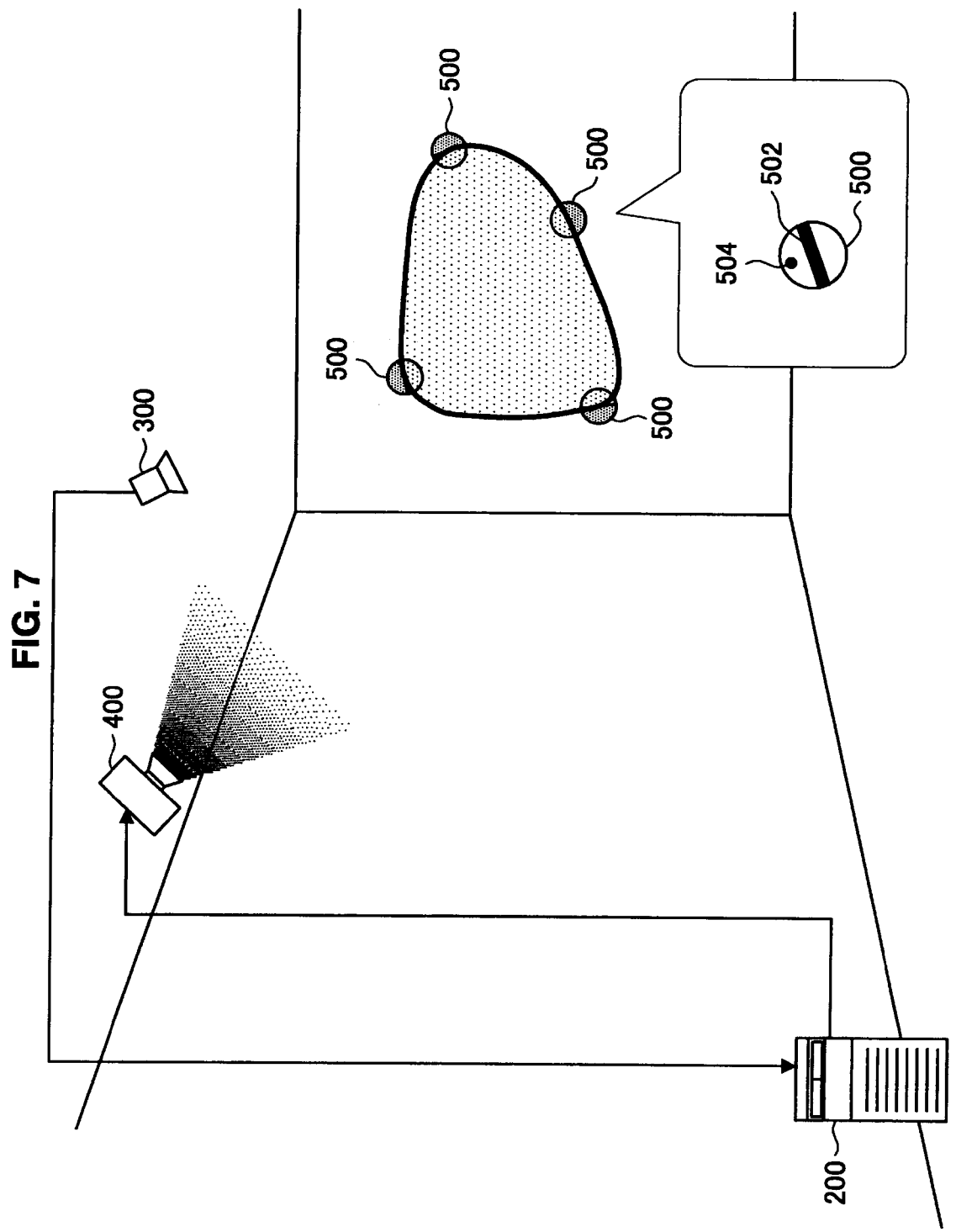

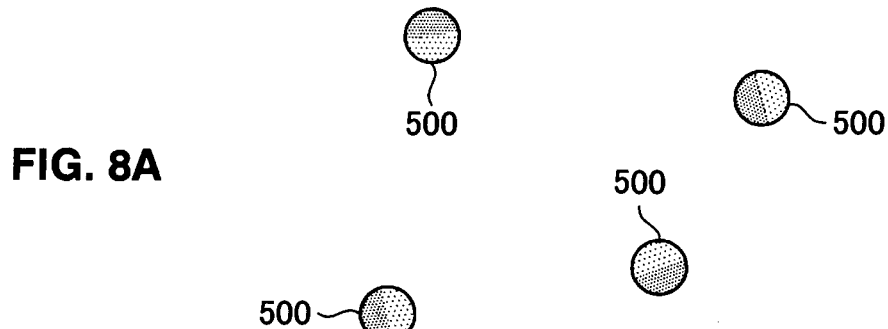
FIG. 8A
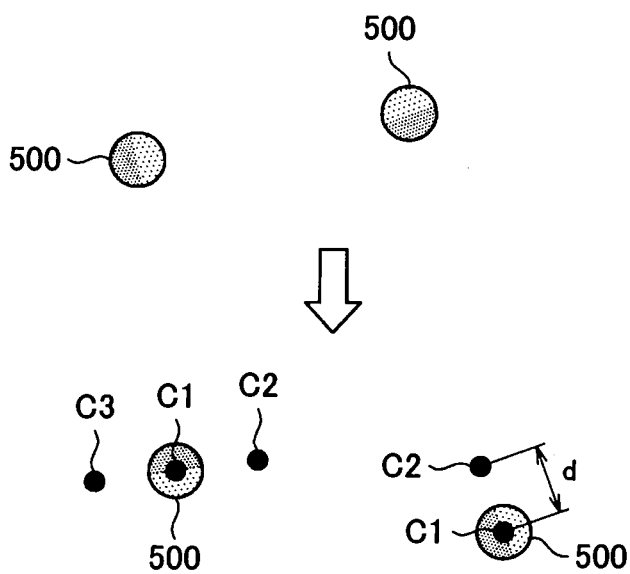
FIG. 8B
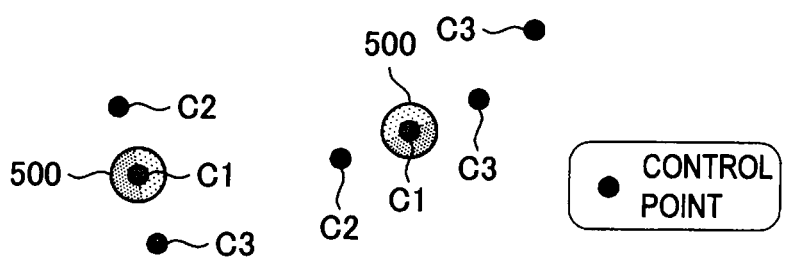
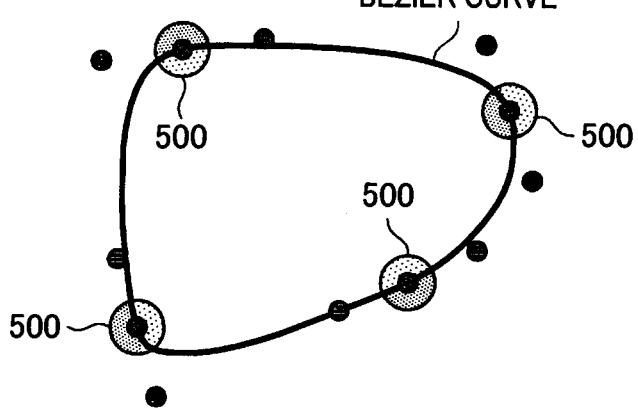
FIG. 8C

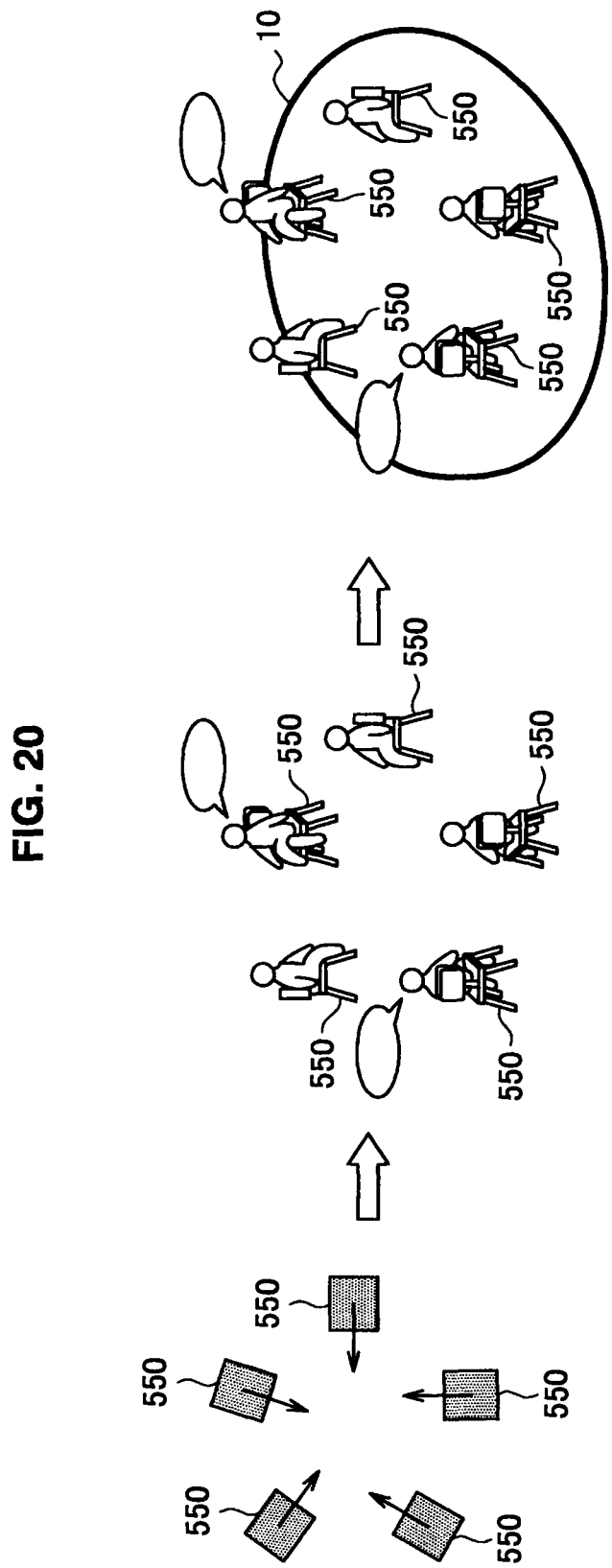

FUNCTION CONTROL METHOD USING BOUNDARY DEFINITION, FUNCTION CONTROL SYSTEM USING BOUNDARY DEFINITION, FUNCTION CONTROL SERVER USING BOUNDARY DEFINITION AND PROGRAM

BACKGROUND OF THE INVENTION

1. Field of the Invention

The present invention relates to a function control method using boundary definition, a function control system using boundary definition, a function control server using boundary definition and a program.

2. Description of the Related Art

In known art, as disclosed in, for example, "CyberCode: Designing Augmented Reality Environments with Visual Tags" (Rekimoto J., Ayatsuka Y., In Proc. of DARE 2000), with systems that use two dimensional bar code technologies, such as QR codes, a method is known to control a terminal in accordance with bar code information. Further, in systems that use projection to perform display, as disclosed in, for example, "Interactive Environment-Aware Display Bubbles" (Cotting D., Gross M., In Proc. of UIST 2006), technology is known by which a shape of a projection range is manipulated.

In addition, in known art, technology is disclosed, for example, in Japanese Patent Application Publication No. JP-A-2006-93792, by which, of sounds emitted outside a sound shielded space, only necessary sound is correctly recognized, and silence is maintained at other times. (See also Japanese Patent Application Publication No. JP-A-2006-339937).

SUMMARY OF THE INVENTION

However, with the technology disclosed in "CyberCode: Designing Augmented Reality Environments with Visual Tags" (Rekimoto J., Ayatsuka Y., In Proc. of DARE 2000), systems etc. that use two dimensional bar code technologies can only be used within a range in which the bar code can be photographed by a camera, thus limiting the situations in which this technology can be used. Furthermore, these systems do not assume flexibility of application, such as a user changing bar code settings and thus changing control of a terminal and so on. In addition, the aim of the technology disclosed in "Interactive Environment-Aware Display Bubbles" (Cotting D., Gross M., In Proc. of UIST 2006) is to manipulate the shape of the projection range itself, and this technology does not posit changing control of a terminal etc. by manipulating the shape.

Moreover, in the design of office space etc. in recent years, it is becoming more popular to not use many partition walls between individual space and common space, so that employees can easily move from individual duties to group work and back again. On the other hand, as sound is almost not blocked at all in this type of office, it can be assumed that inconveniences arise when an employee wishes to concentrate on his or her work, or when several people wish to talk quietly together.

The technology disclosed in Japanese Patent Application Publication No. JP-A-2006-93792 assumes situations in which, of sound entering a space in a room from outside, sound is acquired as necessary. This technology does not assume a situation in which, in a space that does not have physical walls, an individual user wishes to appropriately acquire desired sound.

In light of the foregoing, it is desirable to provide a novel and improved function control method using boundary definition, a function control system using boundary definition, a function control server using boundary definition and a program that allow a user, within a chosen physical space, to easily perform function control of an electronic appliance.

According to an embodiment of the present invention, there is provided, a function control method using boundary definition, includes the steps of, setting a boundary line to virtually partition a given physical space, and controlling a predetermined function of an electronic appliance based on at least one or all of a position of the boundary line, and a shape and a size of a closed loop formed by the boundary line.

In this configuration, the step of setting the boundary line includes the steps of acquiring, respectively, a position of a plurality of position recognition devices arranged in the given physical space, and calculating, based on the position of the plurality of position recognition devices, the boundary line linking the position recognition devices.

In this configuration, a direction of the position recognition devices is acquired along with the position of the position recognition devices, in the step of acquiring the position of the position recognition devices, and a three dimensional Bezier curve is calculated based on the position and the direction of the position recognition devices, in the step of calculating the boundary line.

In this configuration, a function that is realized by the electronic appliance is controlled in accordance with a positional relationship between the position of the boundary line and the electronic appliance that is operated by a user, in the step of controlling the predetermined function.

In this configuration, the function control method using boundary definition further includes the step of displaying the boundary line in the given physical space.

In this configuration, the step of displaying includes the step of displaying the boundary line forming a closed loop along with displaying a function by a predetermined application within the closed loop, and based on one of the shape and the size of the closed loop, the function of the application displayed within the closed loop is controlled, in the step of controlling the predetermined function.

In this configuration, the function control method using boundary definition according to claim 1, further includes the steps of acquiring sound information emitted within the given physical space, acquiring a position of a mobile information terminal that is the electronic appliance and that exists within the given physical space, and transmitting the sound information to the mobile information terminal that is on a same side of a boundary formed by the boundary line as the position at which the sound information is acquired.

In this configuration, the mobile information terminal is worn by a user who is present in the given physical space, and the mobile information terminal plays back and provides sound formed by the sound information to the user.

In this configuration, the function control method using boundary definition according to claim 7, further includes the step of performing 3D mixing on the sound information before the step of transmitting the sound information, the 3D mixing being performed based on a position at which the sound information is acquired and a position of the mobile information terminal to which the sound information is transmitted. The step of transmitting the sound information includes the step of transmitting the sound information on which 3D mixing has been performed.

In this configuration, the sound information is acquired by a microphone provided in the mobile information terminal.

In this configuration, the position recognition devices are provided in physical objects that are arranged within the given physical space.

According to another embodiment of the present invention, there is provided a function control system using boundary definition, includes an electronic appliance with a controllable predetermined function, and a function control server. The function control server includes a boundary line setting portion that sets a boundary line to virtually partition a given physical space, and a function control portion that controls the predetermined function of the electronic appliance based on at least one or all of a position of the boundary line, and a shape or a size of a closed loop formed by the boundary line.

According to another embodiment of the present invention, there is provided a function control server using boundary definition, includes a boundary line setting portion that sets a boundary line to virtually partition a given physical space, and a function control portion that controls a predetermined function of an electronic appliance based on at least one of a position of the boundary line, and a shape or a size of a closed loop formed by the boundary line.

According to another embodiment of the present invention, there is provided a program that comprises instructions that command a computer to function as a boundary line setting device that sets a boundary line to virtually partition a given physical space, and a device to control a predetermined function of an electronic appliance, based on at least one of a position of the boundary line and a shape or a size of a closed loop that is formed by the boundary line.

According to another embodiment of the present invention, there is provided a function control system using boundary definition, includes a mobile information terminal that is present in a given physical space and that transmits and receives sound information by wireless communication, and a sound field boundary definition server. The sound field boundary definition server includes a database that stores boundary information used to virtually partition the given physical space, a sound receiver that acquires sound information transmitted from the mobile information terminal, a position recognition portion that acquires a position of the mobile information terminal, and a sound transmitter that transmits the acquired sound information to the mobile information terminal that is present on a same side of a boundary formed by the boundary information as the mobile information terminal that acquires the sound information.

According to another embodiment of the present invention, there is provided a function control server using boundary definition, includes a database that stores boundary information to virtually partition a given physical space, a sound receiver that acquires sound information emitted within the given physical space, a position recognition portion that acquires a position of a mobile information terminal present within the given physical space, and a sound transmitter that transmits the sound information to the mobile information terminal that is present on a same side of a boundary formed by the boundary information as a position at which the sound information is acquired.

According to another embodiment of the present invention, there is provided a program that comprises instructions that command a computer to function as a device that stores boundary information to virtually partition a given physical space, a device that acquires sound information emitted within the given physical space, a device that acquires a position of a mobile information terminal that is present within the given physical space, and a device that transmits the sound information to the mobile information terminal that is present on a same side of a boundary formed by the boundary information as a position at which the sound information is obtained.

According to the present invention, in a given physical space, a user can easily perform function control of an electronic appliance.

BRIEF DESCRIPTION OF THE DRAWINGS

FIG. 7 is a schematic diagram showing the structure of the function control system according to a second embodiment of the present invention;

FIG. 8 is a series of schematic diagrams showing a technique to determine control points of a three dimensional Bezier curve and define the three dimensional Bezier curve based on the control points;

FIG. 20 is a schematic diagram showing a state in which a virtual wall is established when five chairs are arranged facing each other;

DETAILED DESCRIPTION OF THE EMBODIMENT(S)

Figure 1:
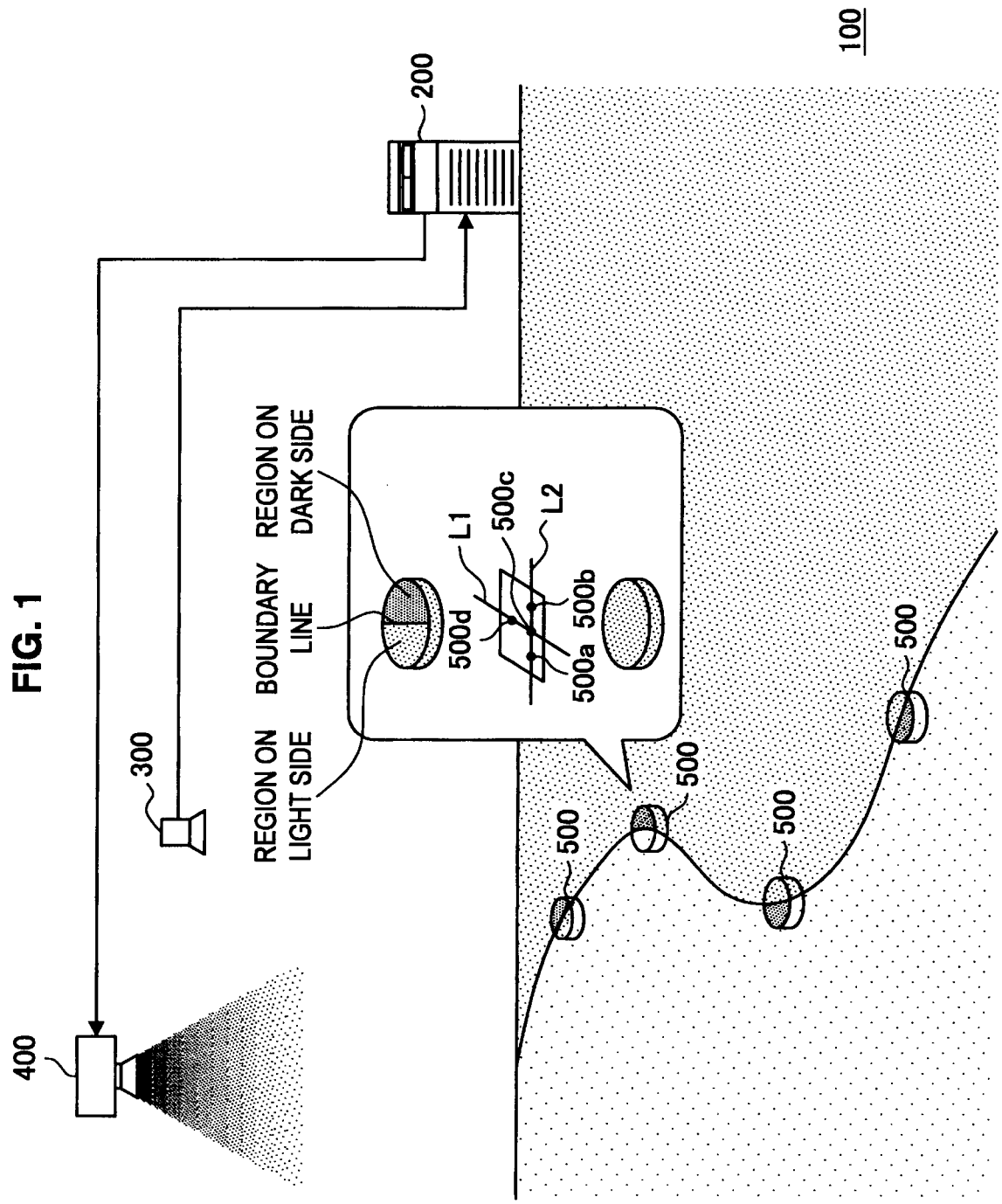
FIG. 1 is a schematic diagram showing the structure of a function control system using boundary definition according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Exemplary embodiments of the present invention will be described in detail in the following order.
1. First embodiment
 (1) Structure of function control system using boundary definition according to first embodiment
 (2) Definition method of three dimensional Bezier curve
 (3) Function control of remote control in accordance with boundary line of three dimensional Bezier curve
 (4) Function block structure of system with server at center
 (5) Processing performed by server
2. Second embodiment
 (1) Structure of function control system using boundary definition according to second embodiment
 (2) Function control of remote control in accordance with boundary line of three dimensional Bezier curve
 (3) Function block structure of system with server at center
 (4) Processing performed by server
3. Third embodiment
 (1) Overview of sound field boundary definition system using boundary definition according to third embodiment
 (2) Structure of function control system using boundary definition according to third embodiment
 (3) Function block structure of sound field boundary definition system with server at center
 (4) Processing performed by server
 (5) Acquisition of ambient sound
4. Fourth embodiment
 (1) Overview of sound field boundary definition system using boundary definition according to fourth embodiment
 (2) Function block structure of function control system using boundary definition with server at center
5. Fifth embodiment
 (1) Structure of sound field boundary definition system using boundary definition according to fifth embodiment

1. First Embodiment

(1) Structure of Function Control System Using Boundary Definition

FIG. 1 is a schematic diagram showing the structure of a function control system 100 using boundary definition according to a first embodiment of the present invention. As shown in FIG. 1, the function control system 100 includes a server 200, an infrared camera 300, a projector 400 and disc shaped devices 500. The function control system 100 is formed, for example, inside a room within a building.

As shown in FIG. 1, a plurality of the disc shaped devices 500 are arranged on a floor inside the room. A plurality of infrared light emitting diodes (LEDs) 500a, 500b, 500c and 500d are arranged on an upper surface of the disc shaped device 500. As shown in FIG. 1, the infrared light emitting diodes 500a, 500b, 500c and 500d are arranged along two intersecting straight lines L1 and L2. The infrared LED 500c is arranged in a position at the center of the disc shaped device 500. The arrangement of the infrared light emitting diodes 500a, 500b, 500c and 500d on the upper surface of each of the disc shaped devices 500 is slightly different on each device. The straight line L2 that is formed of the plurality of infrared light emitting diodes 500a, 500b and 500c is common to each of the disc shaped devices 500, but the position of the LED 500d is biased to the left or to the right along the direction of the straight line L2, and is displaced incrementally on each device. In other words, the straight line L1 is not limited to intersecting the straight line L2 in the center of the straight line L2 (the position of the infrared LED 500c). According to this structure, it is possible to identify not only the position and the direction of each of the disc shaped devices 500, but it is also possible to identify a specific one of the disc shaped devices 500 in accordance with the position of the infrared LED 500d in the direction of the straight line L2. In this way, it is possible to identify not only the position and the direction of each of the disc shaped devices 500, but also an ID number. As an identification process, first the straight line L2 is located from an image on the infrared camera 300, and at that point in time, a user position is uniquely determined as being in the position of the LED 500c (the center point of the straight line L2). The direction is also limited to one of the two directions perpendicular to the straight line L2. Next, the infrared LED 500d is located and the user direction is uniquely determined from the positional relationship between the infrared LED 500d and the straight line L2. Further, in accordance with the position of the infrared LED 500d in the direction of the straight line L2, the specific device can be identified. Note that for the disc shaped device 500 explained according to a second embodiment, ID identification is not required by an application, and all of the devices are thus equipped with a marker using a same retroreflective material.

Furthermore, so that the direction of the disc shaped device 500 is sensorarily communicated to the user, the disc shaped device 500 is divided and colored into two light and dark colors, taking a straight line that passes through the center as a boundary. Here, the direction of the disc shaped device 500 is the direction of a half line that extends from the center of the disc shaped device 500 in the direction of the light side of the two colored regions and that divides the light side into two equal areas.

Meanwhile, the infrared camera 300 is installed in a raised position inside the room, such as on the ceiling, for example. The infrared camera 300 photographs the floor surface and acquires an image of the infrared light emitting diodes 500a, 500b, 500c and 500d of each of the disc shaped devices 500. Data of the image acquired by the infrared camera 300 is transmitted to the server 200.

The server 200 performs image processing on the image data transmitted from the infrared camera 300, and reads the position of each of the disc shaped devices 500 and the direction of each of the disc shaped devices 500. In this case, the position of each of the disc shaped devices 500 can be acquired from the position of the infrared LED 500c that is positioned in the center of the disc shaped device 500. In addition, by lining up the straight line L1 with the boundary line between the two colored regions, for example, in FIG. 1, the left side of the straight line L1 is the lighter side of the two colored regions, and the direction of the disc shaped device 500 can thus be acquired.

(2) Definition Method of Three Dimensional Bezier Curve

Figure 2A:
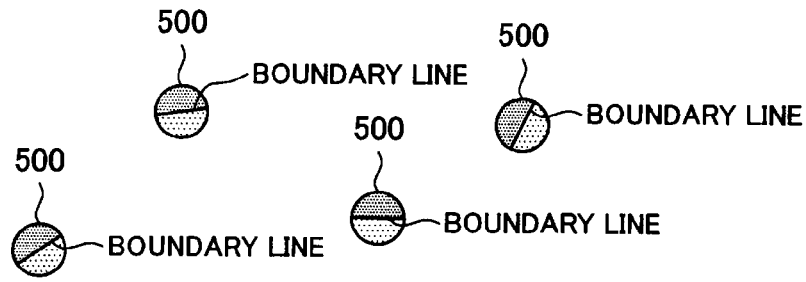
FIG. 2 is a series of schematic diagrams showing a technique to determine control points of a three dimensional Bezier curve and define the three dimensional Bezier curve based on the control points.
Figure 2B:
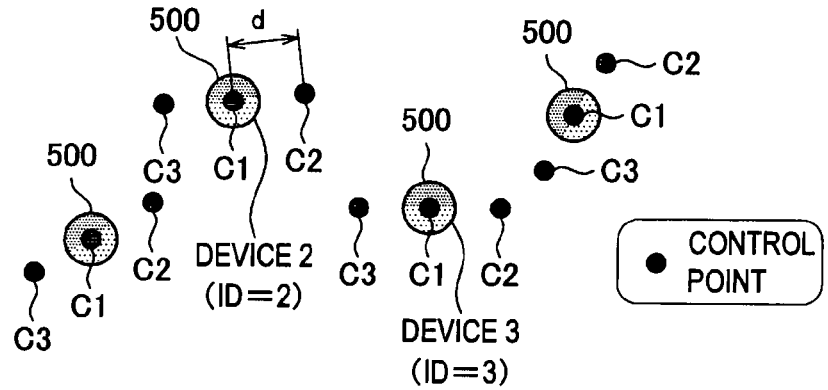
Figure 2C:
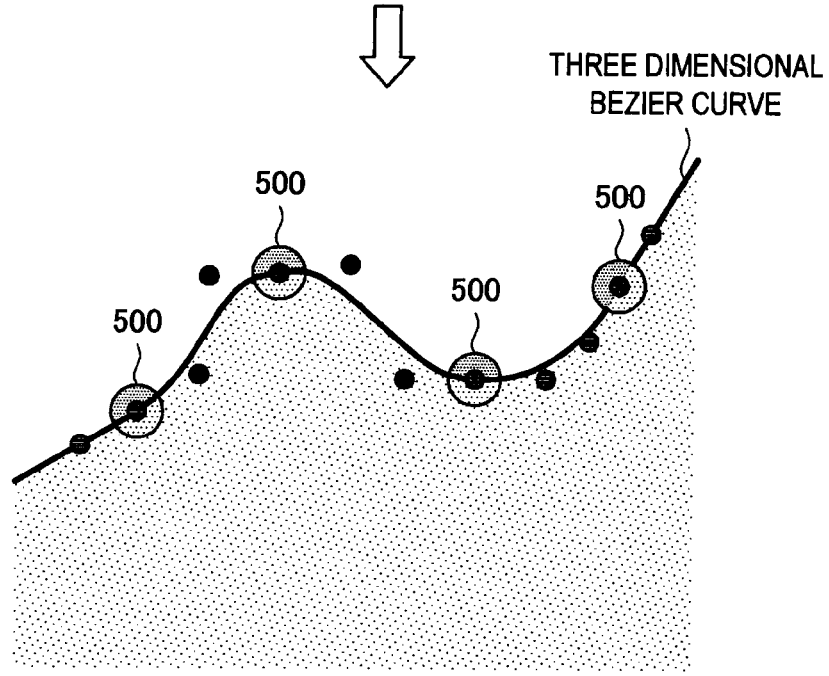

When the server 200 acquires the position and the direction of each of the disc shaped devices 500, this information is used to determine control points of a three dimensional Bezier curve, and to define a three dimensional Bezier curve. FIG. 2A to FIG. 2C are schematic diagrams showing a technique to determine control points of a three dimensional Bezier curve and to define the three dimensional Bezier curve based on those control points. Here, as shown in FIG. 2, a total of three points are used as control points, namely, a center point C1 of the disc shaped device 500, a point C2 which is positioned in a direction at ninety degrees with respect to the center point C1 when the direction of the disc shaped device 500 is zero, and a point C3 that is positioned in a direction at two hundred and seventy degrees with respect to the center point C1 when the direction of the disc shaped device 500 is zero. A distance d from the point C1 to the point C2 and the distance d from the point C1 to the point C3 can be freely set in accordance with the environment etc. in which the present system is assembled.

The Bezier curve is defined by joining the center point C1 of each of the disc shaped devices 500 in a clockwise direction, such that it results in the formation of a single closed graphic form. All the disc shaped devices 500 have a different and unique ID, and the Bezier curve is defined such that it joins the disc shaped devices 500 in order from the smallest ID. For example, when three of the disc shaped devices 500 that have the IDs ID=2, ID=3 and ID=4 are arranged, two Bezier curves are defined, one joining the devices 2 and 3, and one joining the devices 3 and 4. In general, four control points are necessary to draw a single three dimensional Bezier curve. In FIG. 2B, in the case of a curve joining the disc shaped device 500 (the device 2) and the disc shaped device 500 (the device 3), for example, the center point C1 of the device 2 is the first control point and the point C2 of the device 2 is the second control point. Then, the point C3 of the device 3 is the third control point, and the center point C1 of the device 3 is the fourth control point.

Of the disc shaped devices 500 that are present on the floor surface, a half line is drawn from the center point C1 of the disc shaped device 500 with the smallest ID towards the control point that is in a direction at two hundred and seventy degrees with respect to the center point C1. In the same way, a half line is drawn from the center point C1 of the disc shaped device 500 with the largest ID towards the control point that is in a direction at ninety degrees with respect to the center point C1. When these two half lines intersect with each other, a Bezier curve is drawn from the disc shaped device 500 with the largest ID to the disc shaped device 500 with the smallest ID. In this case, the Bezier curve formed by all of the disc shaped devices 500 forms a single closed space.

When the Bezier curve is determined, the server 200 transmits position data of the Bezier curve to the projector 400. The projector 400 projects a boundary line that follows the received Bezier curve onto the floor surface inside the room. In this way, the user can recognize regions that follow the Bezier curve displayed on the floor surface. Furthermore, each of the regions on the floor surface that are partitioned off by the Bezier curve are displayed with different colors by the projection of the projector 400.

Figure 3:
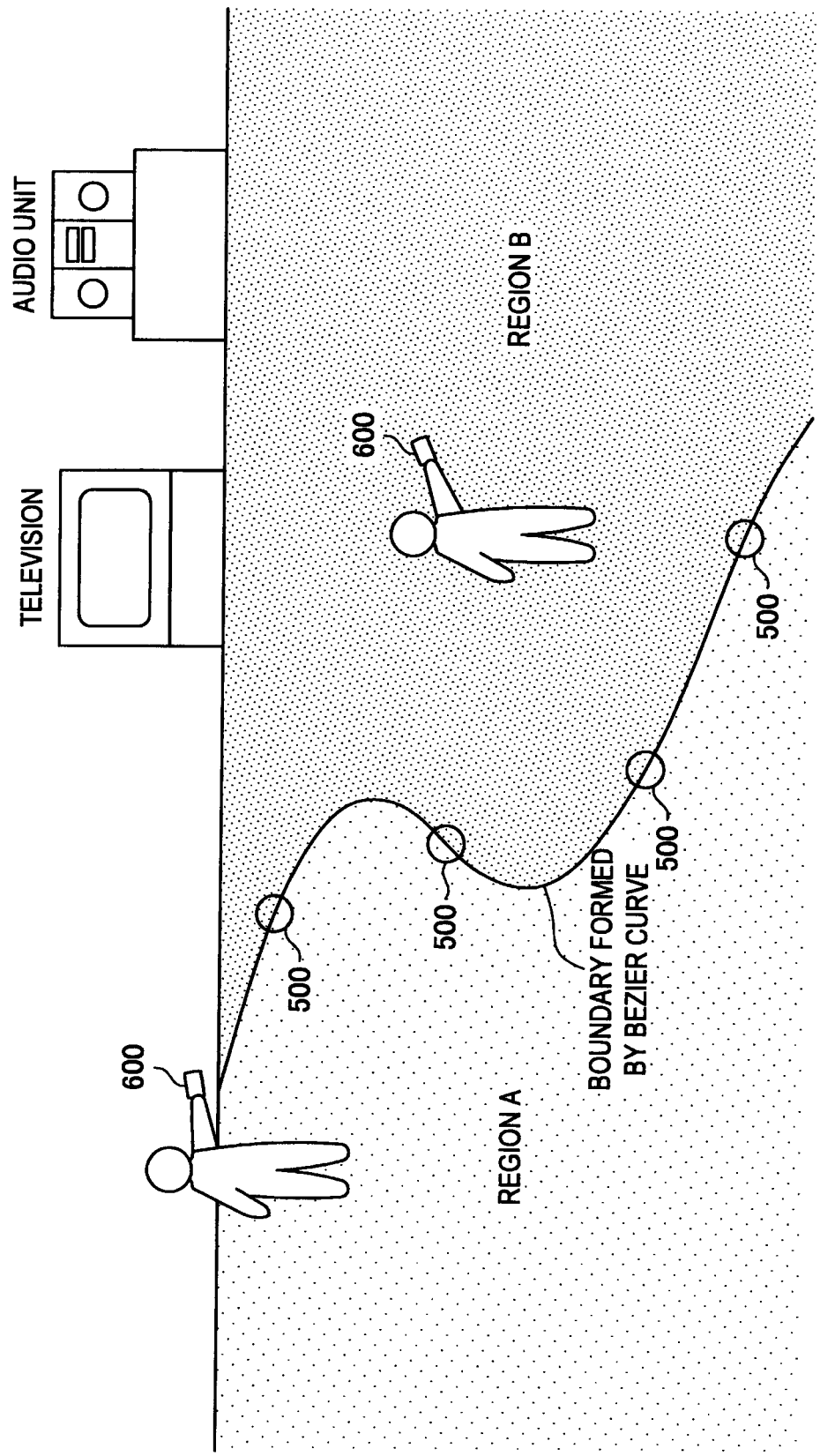
FIG. 3 is a schematic diagram showing a system to control operation by a remote control in accordance with a boundary constructed by disc shaped devices.

(3) Function Control of Remote Control in Accordance with Boundary Line of Three Dimensional Bezier Curve Next, in the present embodiment, the boundary line created by the Bezier curve determined by the disc shaped devices 500 is exemplified by an application that is applied to operation by a remote control. FIG. 3 is a schematic diagram showing a control system to control operation by a remote control 600 in accordance with a boundary line established by the disc shaped devices 500.

As shown in FIG. 3, it is assumed that electronic appliances inside a room are a television and an audio unit. Further, due to the disc shaped devices 500 placed on the floor surface, a boundary line formed by a Bezier curve is set inside the room. The server 200 can control whether the remote control 600 operates one of either the television or the audio unit depending on the position of the remote control 600. For that reason, the remote control 600, in the same way as the disc shaped devices 500, is equipped with an infrared LED to allow positional recognition by the infrared camera 300.

In the example shown in FIG. 3, of the two regions A and B that are partitioned by the boundary line formed by the Bezier curve, when the position of the remote control 600 is within the region A, the television can be operated by the remote control 600. In this case, the audio unit cannot be operated from within the region A.

In addition, when the position of the remote control 600 is within the region B, the audio unit can be operated by the remote control 600. In this case, the television cannot be operated from within the region B.

In this way, by freely positioning the disc shaped devices 500 and thus setting the boundary line formed by the Bezier curve inside the room, the user can appropriately set the electronic appliances to be operated by the remote control 600.

(4) Function Block Structure of System with Server at Center

Figure 4:
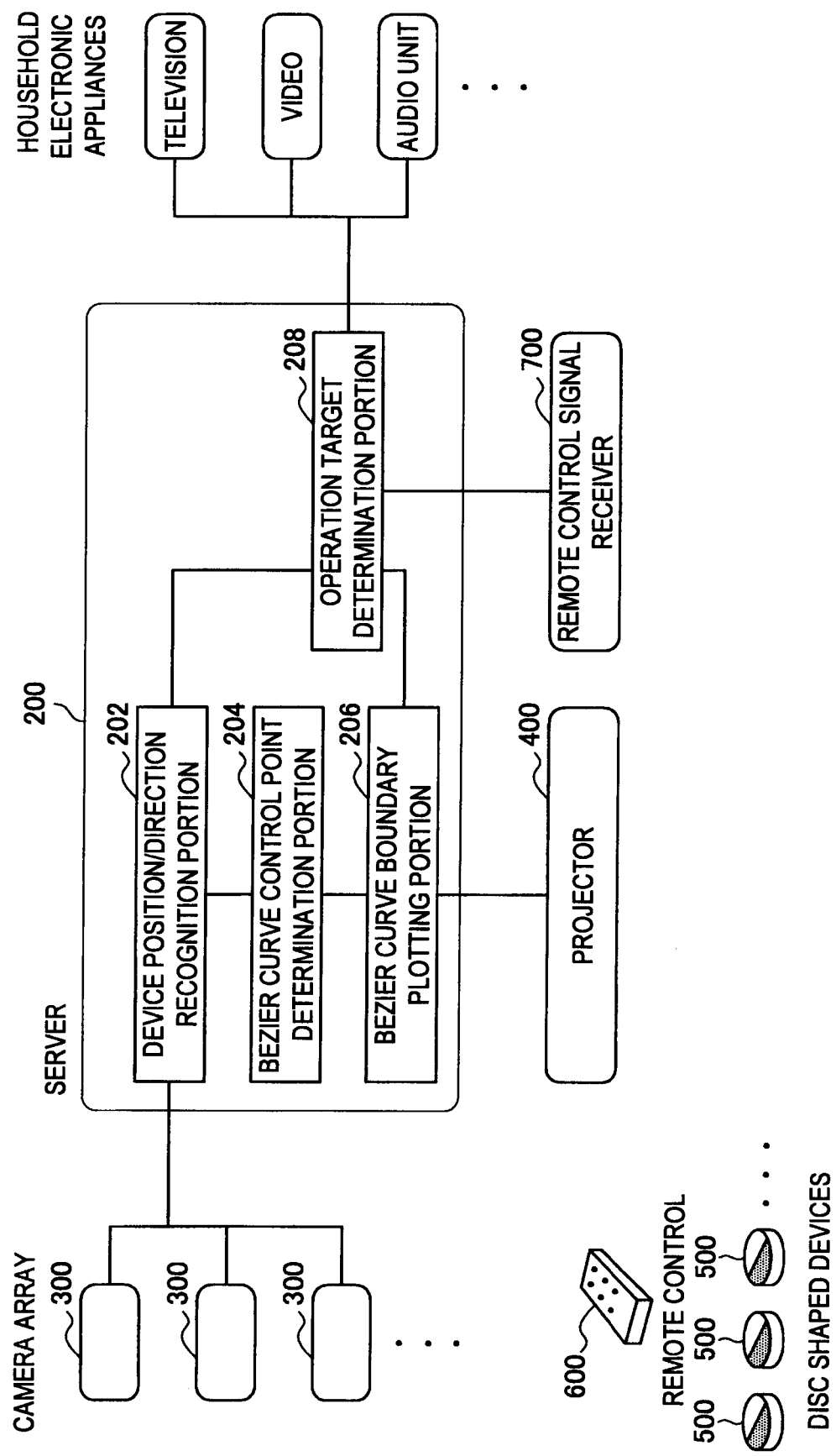
FIG. 4 is a schematic diagram showing the function block structure of the system, with a server at the center.

FIG. 4 is a schematic diagram showing the function block structure of the system with the server 200 at the center. To realize the above-described functions, the server 200 is provided with a device position/direction recognition portion 202, a Bezier curve control point determination portion 204, a Bezier curve boundary plotting portion 206 and an operation target determination portion 208.

Based on the positions of the infrared light emitting diodes 500a, 500b, 500c and 500d of the disc shaped devices 500 transmitted from the infrared camera 300, the device position/direction recognition portion 202 reads the position and the direction of each of the disc shaped devices 500. In addition, based on the position of the infrared LED provided on the remote control 600, the device position/direction recognition portion 202 reads the position of the remote control 600.

From the position and the direction of each of the disc shaped devices 500, the Bezier curve control point determination portion 204 determines the control points to define the Bezier curve. The determination of the control points is performed using the technique described above with reference to FIG. 2.

The Bezier curve boundary plotting portion 206 determines the Bezier curve based on the control points deter-mined by the Bezier curve control point determination portion 204. To project the Bezier curve onto the floor surface, the Bezier curve boundary plotting portion 206 transmits the data to the projector 400. The data of the boundary line formed by the Bezier curve is also transmitted to the operation target determination portion 208.

The operation target determination portion 208 determines the electronic appliance (a household electrical appliance etc.) that is the target of operation, based on the position of the remote control 600 and the position of the boundary line formed by the Bezier curve. When regions are partitioned by the Bezier curve as shown in FIG. 3, the operation target determination portion 208 determines the electronic appliance that is the target of operation depending on the region in which the remote control 600 is positioned.

A remote control signal receiver 700 receives an operation signal transmitted from the remote control 600 and transmits the operation signal to the operation target determination portion 208. The operation target determination portion 208 transmits the received operation signal to the electronic appliance that is the target of operation. Note that the remote control signal receiver 700 may be formed integrally with the server 200.

In addition, the remote control signal receiver 700 may be provided in each of the electronic appliances. In this case, the operation target determination portion 208 transmits, to the electronic appliance that is the target of operation, a signal that allows operation by the operation signal and transmits, to the electronic appliances that are not the target of operation, a signal that disallows operation by the operation signal. In this way, using the operation signal by the remote control 600, it is possible to operate only the electronic appliance that is the target of operation.

Each of the function blocks of the server 200 shown in FIG. 4 can be structured by hardware (a circuit) or by a processor (a CPU) and software (a program) that causes the processor to function. When each of the function blocks is structured by a CPU and software, the program can be stored in a recording medium, such as a memory that is provided in the server 200 or an externally inserted memory etc.

(5) Processing Performed by Server

Figure 5:
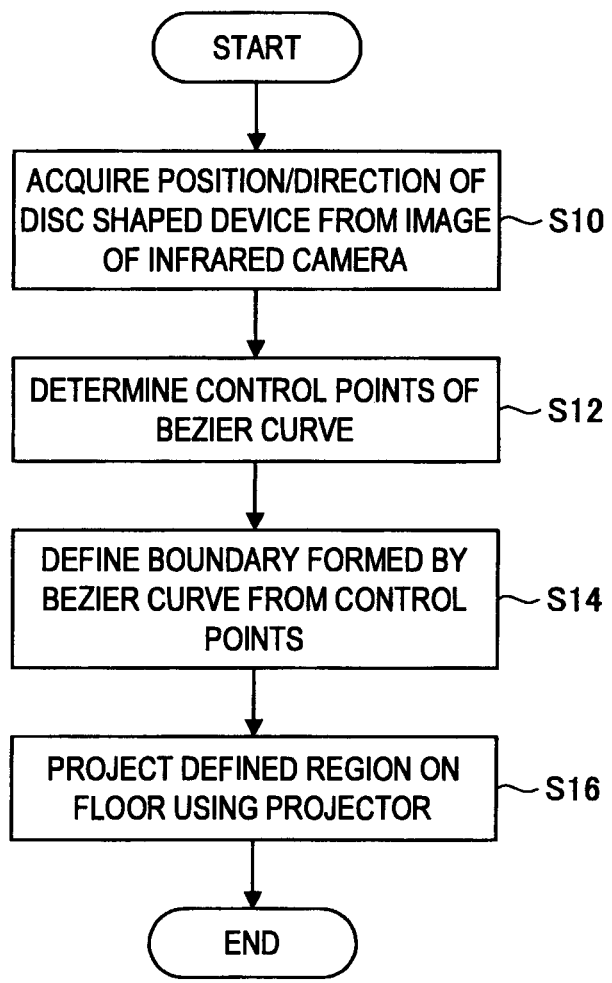
FIG. 5 is a flow chart showing a procedure in which a position and a direction of each of the disc shaped devices are recognized and regions defined by each of the disc shaped devices are projected by a projector.

Next, processing performed by the server 200 will be explained with reference to FIG. 5 and FIG. 6. FIG. 5 is a flow chart showing a procedure in which the position and the direction of each of the disc shaped devices 500 are recognized, and regions defined by each of the disc shaped devices are projected by the projector 400.

First, at step S10, the positions and the directions of the disc shaped devices 500 are acquired from the image of the infrared camera 300. Next, at step S12, the control points of the Bezier curve are determined from the position and the direction of each of the disc shaped devices 500. Then, at step S14, a boundary formed by the Bezier curve is defined from the control points of the Bezier curve. At step S16, the boundary defined by the Bezier curve is projected onto the floor surface by the projector 400 such that the regions partitioned off within the room can be visually confirmed.

Figure 6:
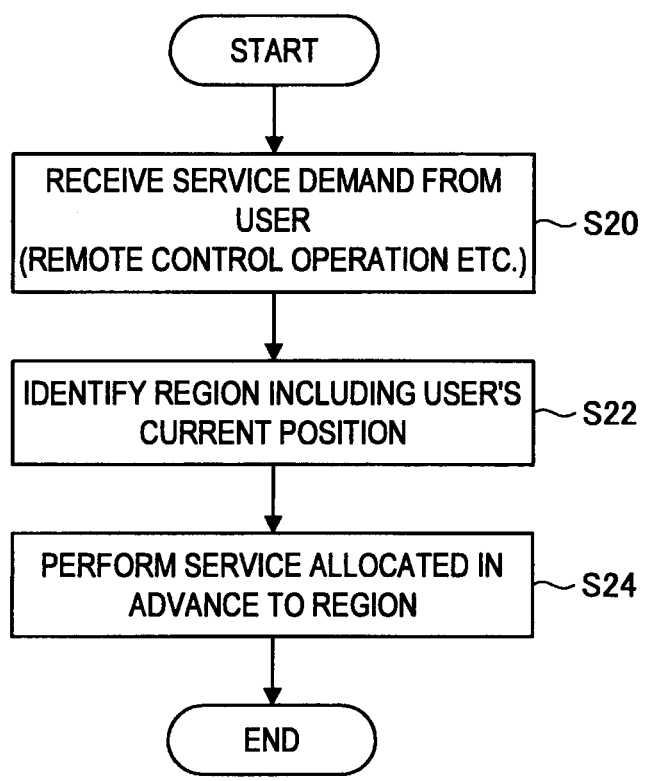
FIG. 6 is a flow chart showing a procedure in which a service requested by a user is performed.

FIG. 6 is a flow chart showing a procedure in which a service requested by the user is performed. First, at step S20, a request for a service is received from the user. Next, at step S22, the position of the remote control 600 is acquired, and it is determined to which of the regions partitioned off by the disc shaped devices 500 the position of the remote control 600 belongs (the current position of the user operating the remote control 600).

At the next step S24, depending on the results of step S22, the service requested by the user is performed. For example, when the remote control 600 belongs to the region A in FIG. 3, as it is determined by the operation target determination portion 208 that target of operation is the television, when the user is requesting to operate the television, television operations are performed.

According to the above-described first embodiment, it is possible to determine a target of operation by the remote control 600 for each of the regions defined by the disc shaped devices 500. It is therefore possible to perform different operations in each region, depending on user requests.

2. Second Embodiment (1) Structure of Function Control System Using Boundary Definition According to Second Embodiment Next, a second embodiment of the present invention will be described. FIG. 7 is a schematic diagram showing the structure of the function control system 100 according to the second embodiment of the present invention. As shown in FIG. 7, the function control system 100 includes the server 200, the infrared camera 300, the projector 400 and the disc shaped devices 500. The function control system 100 is formed, for example, inside a room within a building.

As shown in FIG. 7, a plurality of the disc shaped devices 500 are arranged on a wall inside the room. Each of the disc shaped devices 500 has a same built-in optical marker that uses retroreflective tape, for example.

Furthermore, so that the direction of the disc shaped device 500 is sensorarily communicated to the user, the disc shaped device 500 is divided and colored into two light and dark colors, taking a straight line that passes through the center as a boundary. Similarly to the first embodiment, the direction of the disc shaped device 500 is the direction of a half line that extends from the center of the disc shaped device 500 in the direction of the light side of the two colored regions and that divides the light side into two equal areas. In addition, by a method of attaching a suction cup, for example, to the back side of the disc shaped device 500, the disc shaped device 500 can also be fixed to a vertical wall surface.

As shown in FIG. 7, a band shaped retroreflective tape 502 is adhered to the disc shaped device 500, along the boundary line between the two colored regions. The retroreflective tape 502 is adhered such that it passes through the center of the disc shaped device 500. Further, of the two colored regions of the disc shaped device 500, a circular retroreflective tape 504 is adhered to the region on the light side.

Meanwhile, the infrared camera 300 is installed in a position facing the wall surface on which the disc shaped devices 500 are arranged. The infrared camera 300 is a camera that is provided with an infrared projector, projects infrared rays onto the wall surface on which the disc shaped devices 500 are arranged and, by photographing the wall surface, photographs each of the disc shaped devices 500. It thus acquires an image of the retroreflective tapes 502 and 504 on each of the disc shaped devices 500. Data of the image acquired by the infrared camera 300 is transmitted to the server 200.

The server 200 performs image processing on the image data transmitted from the infrared camera 300, and reads the position and the direction of each of the disc shaped devices 500. In this case, the position of each of the disc shaped devices 500 can be acquired from the position of the center of the retroreflective tape 502. In addition, the direction of each of the disc shaped devices 500 can be acquired from the position of the retroreflective tape 502 with respect to the position (the center position) of each of the disc shaped devices 500.

When the server 200 acquires the position and the direction of each of the disc shaped devices 500, this information is used to determine a three dimensional Bezier curve, and to define the three dimensional Bezier curve. FIG. 8A to FIG. 8C are schematic diagrams showing a technique to determine control points of a three dimensional Bezier curve and to define the three dimensional Bezier curve based on those control points. The technique to define the Bezier curve is substantially the same as in the first embodiment, but in the second embodiment, the boundary line formed by the Bezier curve is a closed loop shaped region.

When the Bezier curve is determined, the server 200 transmits position data of the Bezier curve to the projector 400. The projector 400 projects a boundary line that follows the received Bezier curve onto the wall surface inside the room. In this way, the user can recognize regions that follow the Bezier curve displayed on the wall surface.

Figure 9:
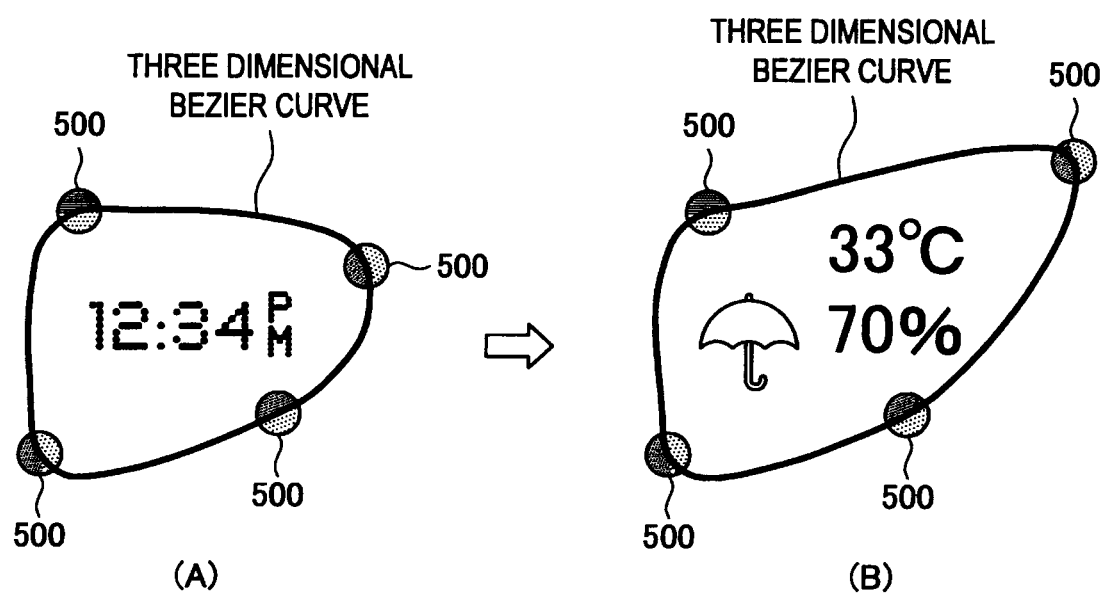
FIG. 9 is a series of schematic diagrams showing states in which a predetermined application is projected within a region encompassed by the Bezier curve.

(2) Function Control of Application in Accordance with Boundary Line of Three Dimensional Bezier Curve Next, in the present embodiment, a predetermined application is projected inside the region encompassed by the Bezier curve, the application being selected in accordance with the number of disc shaped devices, their positional relationships, direction etc. FIG. 9 is a schematic diagram showing a state in which a predetermined application is projected within a region encompassed by the Bezier curve. Here, FIG. 9A shows an example in which the current time is displayed within the region. Further, FIG. 9B shows an example in which the current temperature and humidity are displayed within the region. In this way, the predetermined application is displayed by the projector 400 within the region encompassed by the three dimensional Bezier curve, the predetermined application being determined in accordance with the shape and the size of the three dimensional Bezier curve.

(3) Function Block Structure of System with Server at Center

Figure 10:
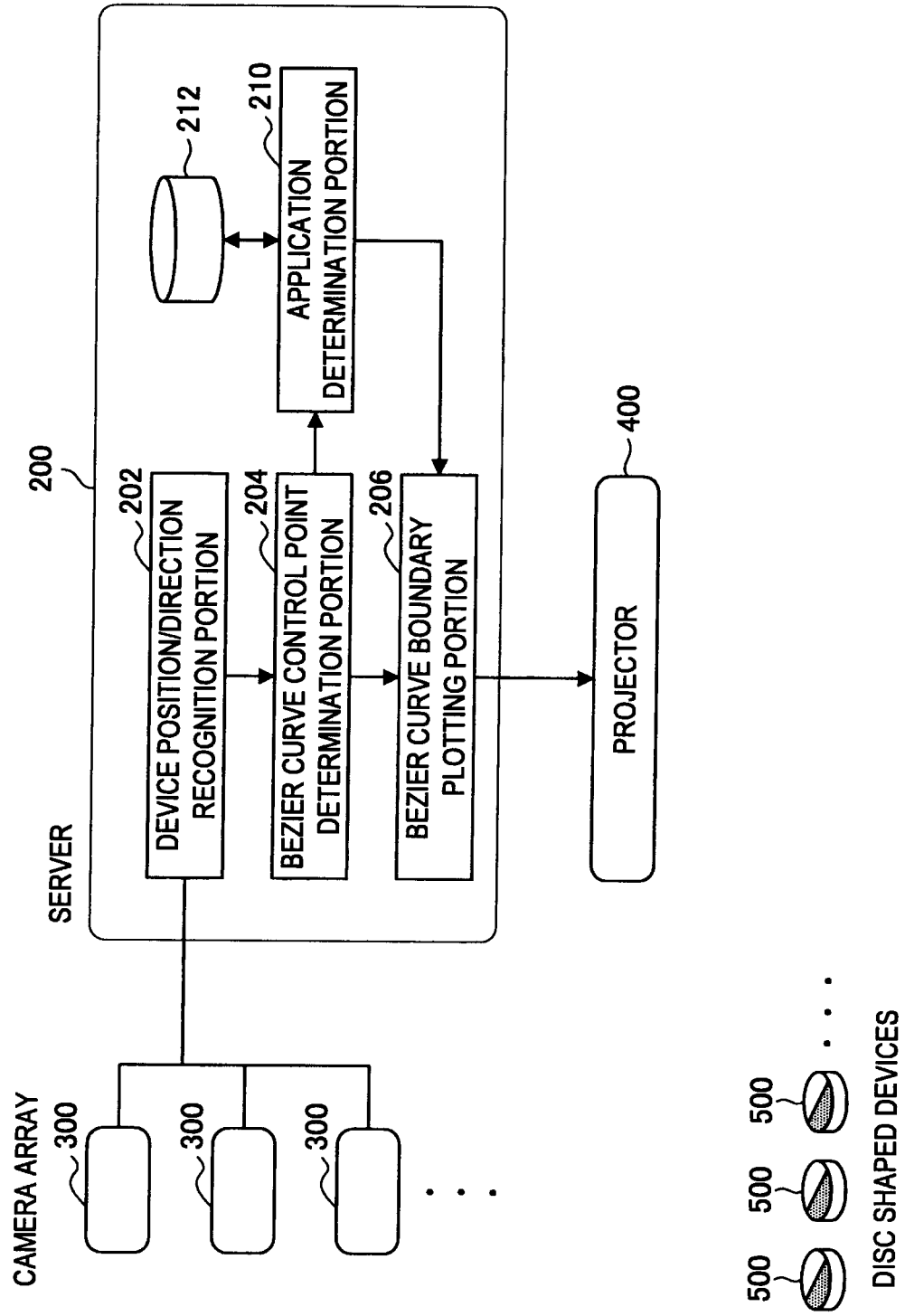
FIG. 10 is a schematic diagram showing the function block structure of the system, with the server at the center.

FIG. 10 is a schematic diagram showing the function block structure of the system, with the server 200 at the center. To realize the above-described functions, the server 200 is provided with the device position/direction recognition portion 202, the Bezier curve control point determination portion 204, the Bezier curve boundary plotting portion 206, an application determination portion 210 and a database 212.

Based on the positions of the retroreflective tapes 502 and 504 of the disc shaped devices 500 transmitted from the infrared camera 300, the device position/direction recognition portion 202 recognizes the position and the direction of each of the disc shaped devices 500.

From the position and the direction of each of the disc shaped devices 500, the Bezier curve control point determination portion 204 determines the control points to define the Bezier curve. The determination of the control points is performed using the technique described above with reference to FIG. 2 and FIG. 8.

The Bezier curve boundary plotting portion 206 determines the Bezier curve based on the control points determined by the Bezier curve control point determination portion 204. To project the Bezier curve onto the wall surface, the Bezier curve boundary plotting portion 206 transmits the data to the projector 400. The data of the boundary line formed by the Bezier curve is also transmitted to the application determination portion 210.

Based on the shape and size of the three dimensional Bezier curve, the application determination portion 210 determines the application that is displayed within the region encompassed by the Bezier curve. More specifically, Fourier descriptors corresponding to the shape and size of the three dimensional Bezier curve are stored in the database 212 provided in the server 200. Further, applications that are relationally mapped with each of the Fourier descriptors are saved in the database 212. The application determination portion 210 calculates a Fourier descriptor from the Bezier curve determined by the Bezier curve boundary plotting portion 206, and compares the calculated Fourier descriptor with the Fourier descriptors stored in the database 212. Then, the application that is relationally mapped to the Fourier descriptor with the highest degree of coincidence is selected from the database 212.

When the application is determined by the application determination portion 210, the determined application is transmitted to the Bezier curve boundary plotting portion 206. The Bezier curve boundary plotting portion 206 transmits data of the application to be displayed to the projector 400, along with data of the Bezier curve to be displayed on the wall surface. The projector 400 displays the determined application inside the region encompassed by the Bezier curve.

Each of the function blocks of the server 200 shown in FIG. 10 can also be structured by hardware (a circuit) or by a processor (a CPU) and software (a program) that causes the processor to function. When each of the function blocks is structured by a CPU and software, the program can be stored in a recording medium, such as a memory that is provided in the server 200 or an externally inserted memory etc.

(4) Processing Performed by Server

Figure 11:
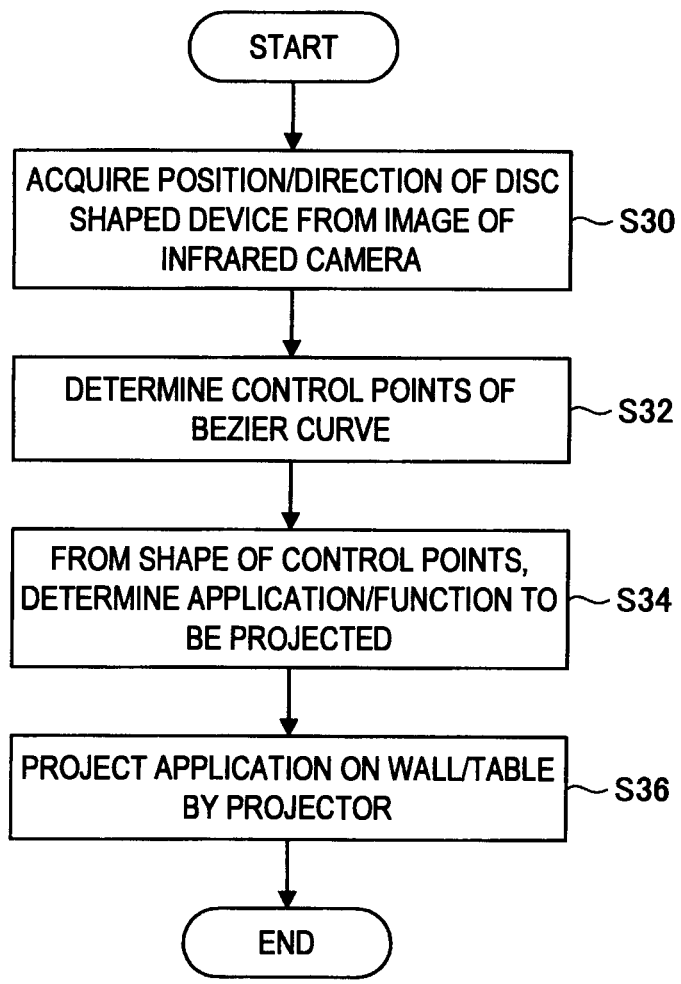
FIG. 11 is a flow chart showing processing performed by the server.

Next, processing performed by the server 200 will be explained with reference to a flow chart in FIG. 11. FIG. 11 is a flow chart showing a procedure in which the disc shaped device 500 is recognized and the application is projected. First, at step S30, the position and the direction of each of the disc shaped devices 500 is acquired from the image of the infrared camera 300.

Next, at step S32, the control points of the three dimensional Bezier curve are determined from the position and the direction of each of the disc shaped devices 500. Then, at step S34, from the shape and the size of the Bezier curve defined by the control points, the application (function) to be projected is selected. Following that, at step S36, the Bezier curve and the application are projected onto the wall surface by the projector 400.

According to the above-described second embodiment, it is possible to display an application that depends on the shape of the Bezier curve within the region of the Bezier curve defined by the disc shaped devices 500. A desired application can therefore be displayed by appropriately setting the positions of the disc shaped devices 500.

Figure 12:
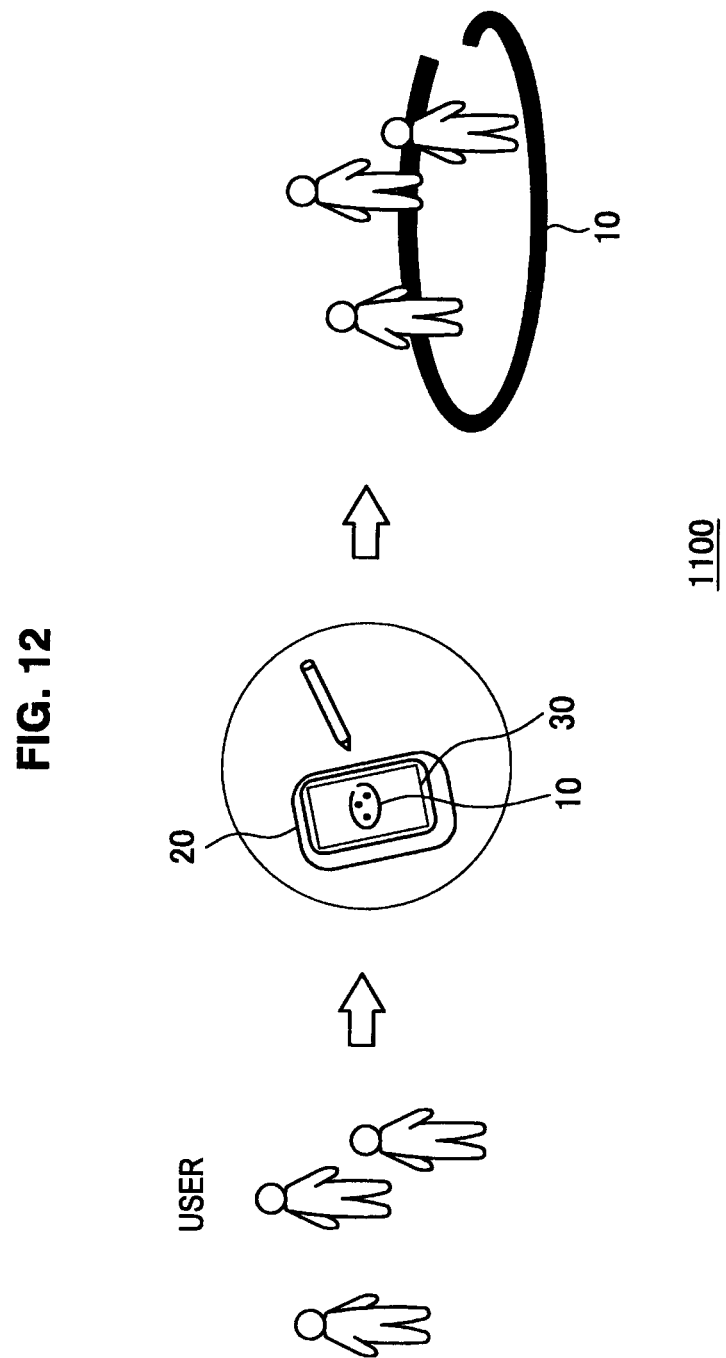
FIG. 12 is a schematic diagram showing an overview of a sound field boundary definition system according to a third embodiment of the present invention.

3. Third Embodiment (1) Overview of Sound Field Boundary Definition System Using Boundary Definition According to Third Embodiment FIG. 12 is a schematic diagram showing an overview of a function control system 1100 using boundary definition according to a third embodiment of the present invention. With the function control system 1100 using boundary definition according to the third embodiment of the present invention, the user operates a mobile terminal 20 (a personal digital assistant (PDA) device or the like). In this way, in a space inside a building, for example, the user can construct a space that is partitioned off by a virtual wall 10. When the virtual wall 10 is constructed, users positioned on the same side of a boundary formed by the virtual wall 10 can conduct a conversation with each other. Meanwhile, each user cannot conduct a conversation with a user on the other side of the virtual wall 10. In this way, the function control system 1100 using boundary definition according to the present embodiment, even without constructing an actual wall, by constructing the virtual wall 10, the virtual wall 10 makes it possible to allow conversation between users and to block other ambient sound, similarly to a case in which an actual wall is in place.

FIG. 12 schematically shows a situation in which users using the mobile terminal 20 generate the virtual wall 10. In this case, a bird's eye view of a room 30 in which the users are currently present is displayed on a display screen of the mobile terminal 20. By freely drawing on the display screen, the virtual wall 10 can be installed inside the room 30. The virtual wall 10 that has been plotted and set is projected by a projector onto the floor of the room 30, and can be visually confirmed by the users. This will be explained in more detail later.

Figure 13:
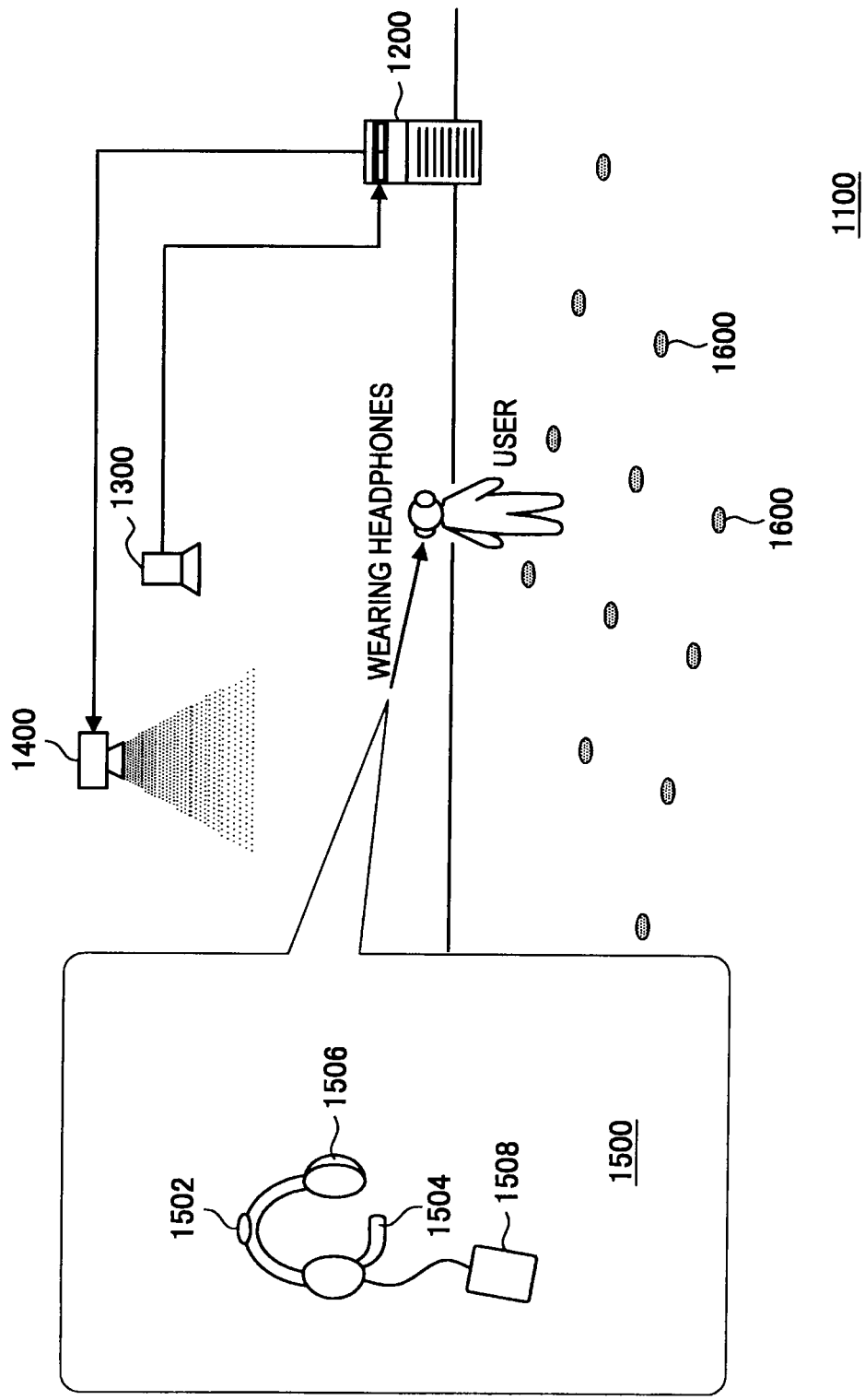
FIG. 13 is a schematic diagram showing the structure of the sound field boundary definition system according to the third embodiment of the present invention.

(2) Structure of Sound Field Boundary Definition System Using Boundary Definition According to Third Embodiment FIG. 13 is a schematic diagram showing the structure of the function control system 1100 using boundary definition according to the third embodiment of the present invention. As shown in FIG. 13, the function control system 1100 using boundary definition includes a server 1200, an infrared camera 1300, a projector 1400 and a mobile information terminal 1500. As described above, the function control system 1100 using boundary definition is formed, for example, within a room inside a building. A plurality of users is inside the room and each of the users wears the mobile information terminal 1500.

The mobile information terminal 1500 takes the form of headphones, and is provided with a position recognition marker 1502, a microphone 1504, noise canceling headphones (speakers) 1506 and a communication portion 1508. The position recognition marker 1502 is mounted on a top surface of the headphones 1506. The position recognition marker 1502 is formed of an infrared LED marker.

Figure 14:
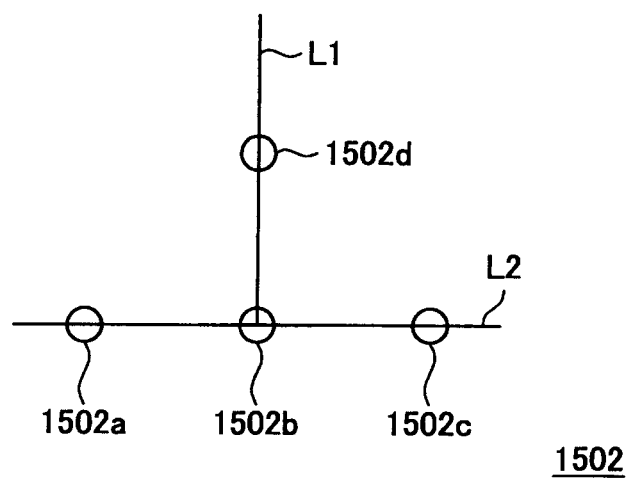
FIG. 14 is a plan view showing the structure of a position recognition marker.

FIG. 14 is a plan view of the structure of the position recognition marker 1502, showing the position recognition marker 1502 in a state of being viewed from above. As shown in FIG. 14, the position recognition marker 1502 includes a plurality of infrared light emitting diodes 1502a, 1502b, 1502c and 1502d. The infrared light emitting diodes 1502a, 1502b, 1502c and 1502d are arranged along two intersecting straight lines L1 and L2. The infrared LED 1502b is arranged in a position at the center of the position recognition marker 1502. Note that the shape of the position recognition marker 1502 is not limited to the structure shown in FIG. 14, and the structure can be slightly differently on each mobile information terminal 1500 for each user, respectively. For example, the straight line L2 that is formed of the plurality of infrared light emitting diodes 1502a, 1502b and 1502c may be common to the mobile information terminal 1500 of each of the users, but the position of the infrared LED 1502d may be biased to the left or to the right along the direction of the straight line L2 and displaced incrementally per each user. In other words, the straight line L1 is not limited to intersecting the straight line L2 in the center of the straight line L2 (the position of the infrared LED 1502b). According to this structure, it is possible to identify not only the position and the direction of each of the mobile information terminals 1500, but it is also possible to identify a specific one of the mobile information terminals 1500 in accordance with the position of the infrared LED 1502d in the direction of the straight line L2, and to identify which of the users is using it. As an identification process, first the straight line L2 is located from an image on the infrared camera 1300, and at that point in time, a user position is uniquely determined as being in the position of the infrared LED 1502b (the center point of the straight line L2). The direction is also limited to one of the two directions perpendicular to the straight line L2. Next, the infrared LED 1502d is located and the user direction is uniquely determined from the positional relationship between the infrared LED 1502d and the straight line L2. Further, in accordance with the position of the infrared LED 1502d in the direction of the straight line L2, the specific user can be identified.

The end of the straight line L1 is arranged such that it leads in the direction of the face (the direction of the line of sight) of the user wearing the headphones 1506. Further, the straight line L2 is arranged in the direction in which the left and right speakers (the left and right ears of the user) of the headphones 1506 are joined.

Meanwhile, the infrared camera 1300 is installed in a raised position inside the room, such as on the ceiling, for example. A plurality of the infrared cameras 1300 are, for example, arranged in an array on the ceiling. The infrared camera 1300 photographs in a downward direction from the ceiling, and acquires an image of the infrared light emitting diodes 1502a, 1502b, 1502c and 1502d of the position recognition marker 1502 of each of the users. Data of the image acquired by the infrared camera 1300 is transmitted to the server 1200.

The server 1200 performs image processing on the image data transmitted from the infrared camera 1300, and reads the position and the direction of each of the position recognition markers 1502. In this case, the position of each of the position recognition markers 1502 can be acquired from the position of the infrared LED 1502b that is positioned in the center of the position recognition marker 1502. In addition, as the direction of the straight line L1 can be determined from the position of the infrared LED 1502d with respect to the straight line L2, the direction of the position recognition marker 1502 can be determined from the direction of the straight line L1. Based on this, the direction of the user's face can be acquired.

The headphones 1506 are equipped with the communication portion 1508. The communication portion 1508 and the server 1200 can communicate with each other via a wireless LAN, for example. The communication portion 1508 can be provided with the functions of the mobile terminal 20 described with reference to FIG. 12, and, by operating the communication portion 1508, the user can set the position of the virtual wall 10 and can transmit that information to the server 1200. Note that the user can also set the virtual wall 10 using another mobile terminal that is communicably connected to the server 1200 by a wireless LAN or the like. When the server 1200 receives information of the virtual wall 10 set up by the user, it saves that information in a database and controls the functions of the mobile information terminals 1500 worn by each of the users in accordance with the position of the virtual wall 10.

In this case, for example, only one of the mobile information terminals 1500 used by a specific one of the users may be provided with a function to set the virtual wall 10. Alternatively, the mobile information terminals 1500 used by all of the users may be provided with the function to set the virtual wall 10, and the information of the virtual wall 10 in the database of the server 1200 may be updated each time one of the users sets the virtual wall 10. Furthermore, when different virtual walls 10 are set by two or more mobile information terminals 1500, the virtual wall 10 set by one of the mobile information terminals 1500 may be determined based on a predetermined order of priority.

In addition, the microphone 1504 provided on the mobile information terminal 1500 is connected to the communication portion 1508, and the start of speech by all the users is captured by the microphone 1504 and transmitted from the communication portion 1508 to the server 1200.

The server 1200 controls the functions of each of the mobile information terminals 1500 based on the position of the virtual wall 10, and the position of each of the mobile information terminals 1500. More specifically, the server 1200 performs control such that mutual conversation can be conducted between all of the mobile information terminals 1500 positioned on a same side of the virtual wall 10. The server 1200 ascertains the position of each of the users from the position of each of the mobile information terminals 1500, and also ascertains the position of the virtual wall 10. Thus, it can determine whether or not conversation between a selected two of the users is blocked by the virtual wall 10. When a specific one of the users (provisionally referred to as the user A) starts speech, the speech of the user A is transmitted only to the mobile information terminals 1500 of the other users who do not have the virtual wall 10 between them and the user A. For the most part, ambient sound is mostly shielded from the ears of the user by a noise canceling function of the headphones 1506, and the sound level of the speech by the other users communicated directly to the ears of the user is also sufficiently suppressed. As a result, the sound that the user wearing the mobile information terminal 1500 can hear is only the sound transmitted intentionally by the server 1200.

As a consequence, as each of the users can almost not hear the voices of users at a distance on the other side of the virtual wall 10, the virtual wall 10 performs a function that is substantially the same as an actual wall with respect to sound.

To explain the process more specifically, the server 1200 inputs the position of the user A that has transmitted speech, along with speech information, into a 3D mixer and transmits speech information obtained from the 3D mixer to all the users positioned on the same side of the virtual wall 10 (provisionally referred to as the users B). At that time, the position and the direction of the user B to which the information is transmitted is also input into the 3D mixer, and the speech information of the user A is transmitted to the user B while taking into account the position of the user B and the direction of the face (namely, the direction of the ears) of the user B to which the information is transmitted. In this way, real sound can be transmitted to each of the users depending on the position of the user A who is speaking, and the position of the user B to which the information is transmitted, and the direction of the face of the user B.

In a similar way to the infrared camera 1300, the projector 1400 is installed in a raised position inside the room, such as on the ceiling, for example. The projector 1400 acquires position information of the virtual wall 10 from the server 1200 and projects a boundary line corresponding to the virtual wall 10 onto the floor surface. In this way, each of the users can visually confirm the position of the virtually set virtual wall 10.

As described above, in the design of office space etc. in recent years, it is becoming more popular to not use many partition walls between individual space and common space, so that employees can easily move from individual duties to group work and back again. On the other hand, as sound is almost not shielded at all in this type of office, it can be assumed that inconveniences arise in some situations, such as when an employee wishes to concentrate alone on his or her work, or when several people wish to talk quietly together.

With the function control system 1100 using boundary definition according to the present embodiment, the server 1200 recognizes the position of the mobile information terminals 1500 of each of the users, and controls each of the headphones 1506 such that the users positioned on the same side of the virtual wall 10 can mutually converse with each other. Therefore, without actually constructing a physical barrier (wall), it is possible for the users to mutually conduct a desired conversation.

Furthermore, as each of the users can visually confirm the virtual wall 10 that is projected by the projector 1400, when a meeting etc. is being conducted in one region partitioned off by the virtual wall 10, for example, users not participating in the meeting can move to another region and thus cannot hear the content of the meeting. Therefore, simply by moving a slight distance within the same room, the content of the meeting cannot be heard, and the employee can concentrate on his or her own work.

Figure 15:
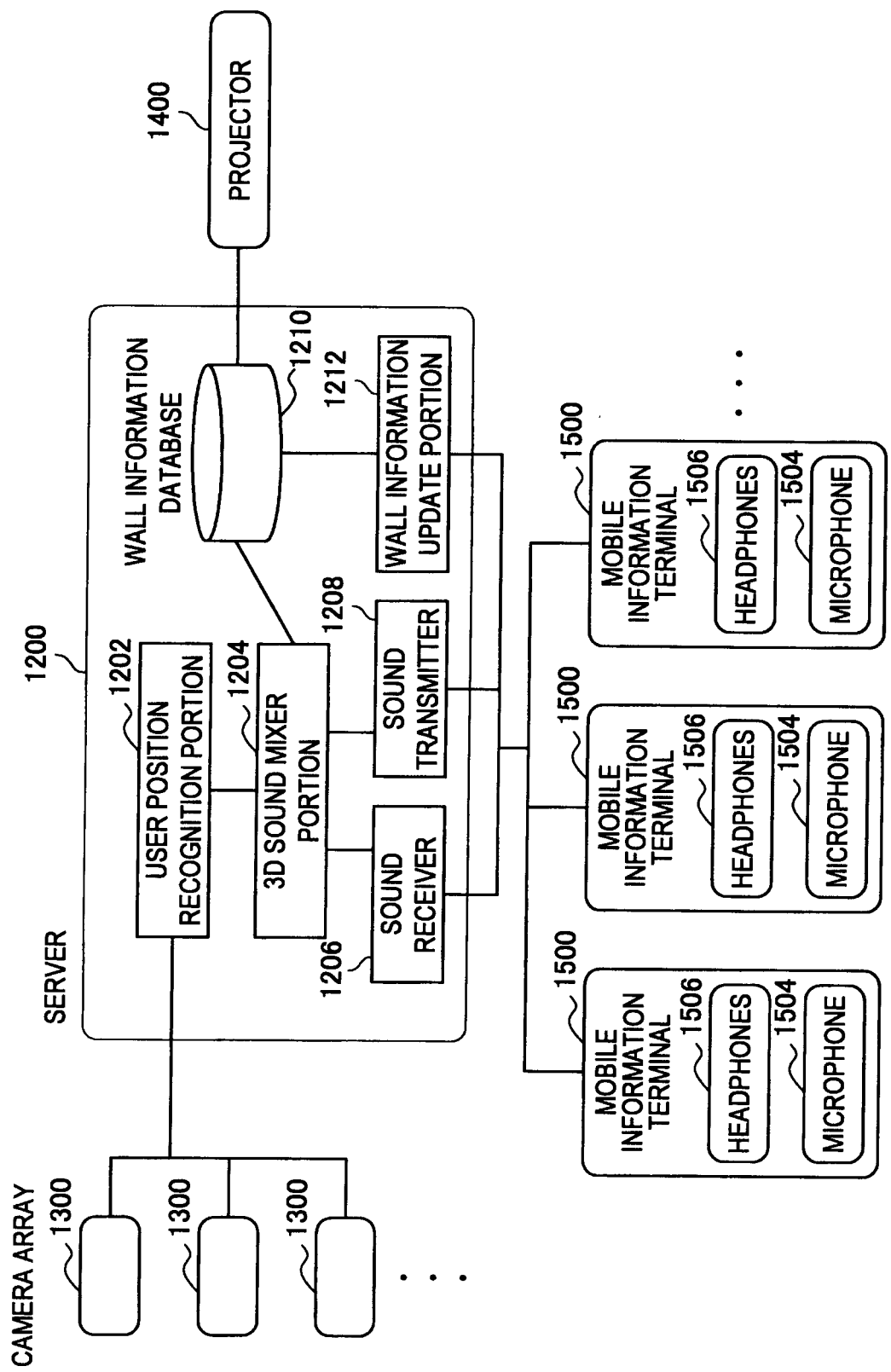
FIG. 15 is a schematic diagram showing the function block structure of the system, with a server at the center.

(3) Function Block Structure of Sound Field Boundary Definition System with Server at Center FIG. 15 is a schematic diagram showing the function block structure of the function control system 1100 according to the third embodiment, with the server 1200 at the center. To realize the above-described functions, the server 1200 is provided with a user position recognition portion 1202, a 3D sound mixer portion 1204, a sound receiver 1206, a sound transmitter 1208, a wall information database 1210 and a wall information update portion 1212.

The user position recognition portion 1202 reads the position of each of the users and the direction in which the user is facing, based on the position of the infrared light emitting diodes 1502a, 1502b, 1502c and 1502d of each of the position recognition markers 1502 transmitted from the infrared camera 1300. The sound receiver 1206 receives speech information acquired by the microphone 1504 of the mobile information terminal 1500 of each of the users. The 3D sound mixer portion 1204 mixes the speech information received by the sound receiver 1206 in accordance with the position of the user from whom the information is transmitted, the position of each of the users to whom the information is transmitted and the direction of the face of each of the users to whom the information is transmitted. It then performs settings such that the users positioned on the same side of the virtual wall 10 can converse with each other, and transmits the mixed speech information to the sound transmitter 1208. The sound transmitter 1208 transmits the speech information of each of the users that is transmitted from the 3D sound mixer portion 1204 to the mobile information terminals 1500 of each of the users, such that the users positioned on the same side of the virtual wall 10 can converse with each other.

The wall information update portion 1212 receives information of the virtual wall 10 set by the user, and each time the virtual wall 10 is newly set, it updates the information of the virtual wall 10. The updated information of the virtual wall 10 is saved in the wall information database 1210.

Each of the function blocks shown in FIG. 15 can be structured by hardware (a circuit) or by a processor (a CPU) and software (a program) that causes the processor to function. When each of the function blocks is structured by a processor and software, the program can be stored in a recording medium, such as a memory that is provided in the server 1200 or an externally inserted memory etc.

(4) Processing Performed by Server

Figure 16:
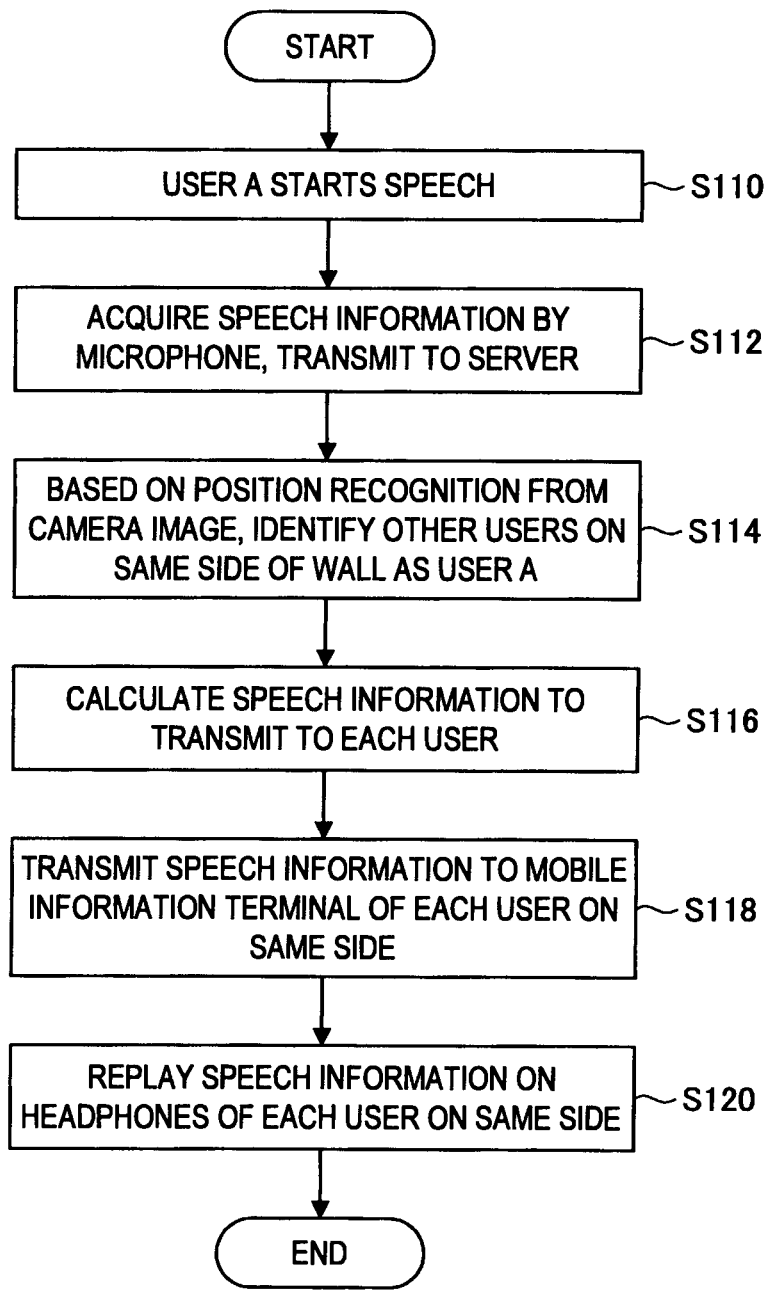
FIG. 16 is a flow chart showing processing performed by the server.

Next, processing performed by the server 1200 will be explained with reference to FIG. 16. For this processing, it is assumed that, by the user operating the mobile information terminal 1500, the information for the virtual wall 10 is transmitted to the server 1200 and the information is saved in the wall information database 1210. First, at step S110, the user A starts speech. At the next step S112, speech information generated by the speech of the user A is acquired by the microphone 1504 of the mobile information terminal 1500 worn by the user A, and the speech information is transmitted from the communication portion 1508 to the server 1200.

Next, at step S114, based on the position of each of the mobile information terminals 1500 acquired by the position recognition infrared camera 1300, by referring to position information of the virtual wall 10 saved in the wall information database 1210, the other users on the same side of the virtual wall 10 as the user A are identified.

At the next step S116, based on the position and the direction of each of the mobile information terminals 1500 acquired by the position recognition infrared camera 1300, speech information is calculated in order to transmit to each of the users identified as being on the same side of the virtual wall 10 as the user A at step S114. The calculation is performed by the 3D sound mixer portion 1204 provided in the server 1200, and, as described above, the speech information of the user A is mixed in accordance with the position of the user A, and the position and the direction of the user to whom the information is transmitted.

Next, at step S118, the speech information calculated at step S116 is transmitted to the mobile information terminals 1500 of each of the users. Then, at step S120, the users on the same side of the virtual wall 10 as the user A receive the speech information transmitted at step S118, and the speech information is replayed on the headphones 1506. In this way, only the users on the same side of the virtual wall 10 as the user A can hear the speech of the user A.

(5) Acquisition of Ambient Sound

As shown in FIG. 13, microphones 1600 are arranged at predetermined intervals in the floor surface inside the room and ambient sound within the room is acquired by the microphones 1600. The positions of the microphones 1600 are stored in advance in a database of the server 1200. Information of the ambient sound acquired by the microphones 1600 is transmitted to the sound receiver 1206 of the server 1200 and is transmitted only to the users positioned on the same side of the virtual wall 10 as the microphones 1600 that acquired the ambient sound. In this way, for example, sound information other than the speech information (a sound when a pen is dropped on the floor, for example) can also be played back by the headphones 1506 of the user.

3D mixing is also performed on the information of the ambient sound acquired by the microphones 1600, the mixing being performed by the 3D sound mixer portion 1204, based on the position of the microphones and the position and the direction of the user to whom the information is transmitted. Therefore, the user can hear actual sound at the same level as real sound, also in terms of ambient sound.

As a result, in addition to the speech of each of the users, the ambient sound collected by the microphones 1600 is also transmitted to the server 1200 and can be transmitted only to the users positioned on the same side of the virtual wall 10. Therefore, sounds such as footsteps or a pen being dropped on the floor can also be heard by the user, for example, thus realizing a more natural sound field experience.

As described above, with the present embodiment, as the virtual wall 10 is defined and speech by a selected user is only transmitted to the users positioned on the same side of the virtual wall 10, sound can be blocked by the virtual wall 10 without actually constructing a physical wall. Therefore, in an office space or the like, it is possible to realize a desired space that is partitioned off by the virtual wall 10.

Figure 17:
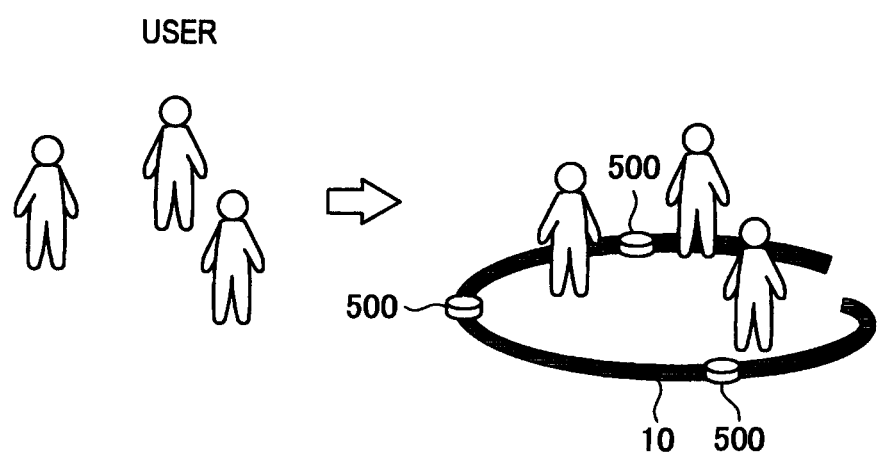
FIG. 17 is a schematic diagram showing an overview of a function control system using boundary definition according to a fourth embodiment of the present invention.

4. Fourth Embodiment (1) Overview of Sound Field Boundary Definition System Using Boundary Definition According to Fourth Embodiment FIG. 17 is a schematic diagram showing an overview of a function control system 2100 using boundary definition according to a fourth embodiment of the present invention. In a similar way to the third embodiment, the function control system 2100 using boundary definition according to the fourth embodiment of the present invention controls each of the headphones 1506 such that users positioned on the same side of the virtual wall 10 can converse with each other. As shown in FIG. 17, in the fourth embodiment, the virtual wall 10 is set by the disc shaped devices 500 explained in the first embodiment. By arranging the disc shaped devices 500 in chosen positions on the floor surface, the user can set the virtual wall 10 in a desired shape.

Figure 18:
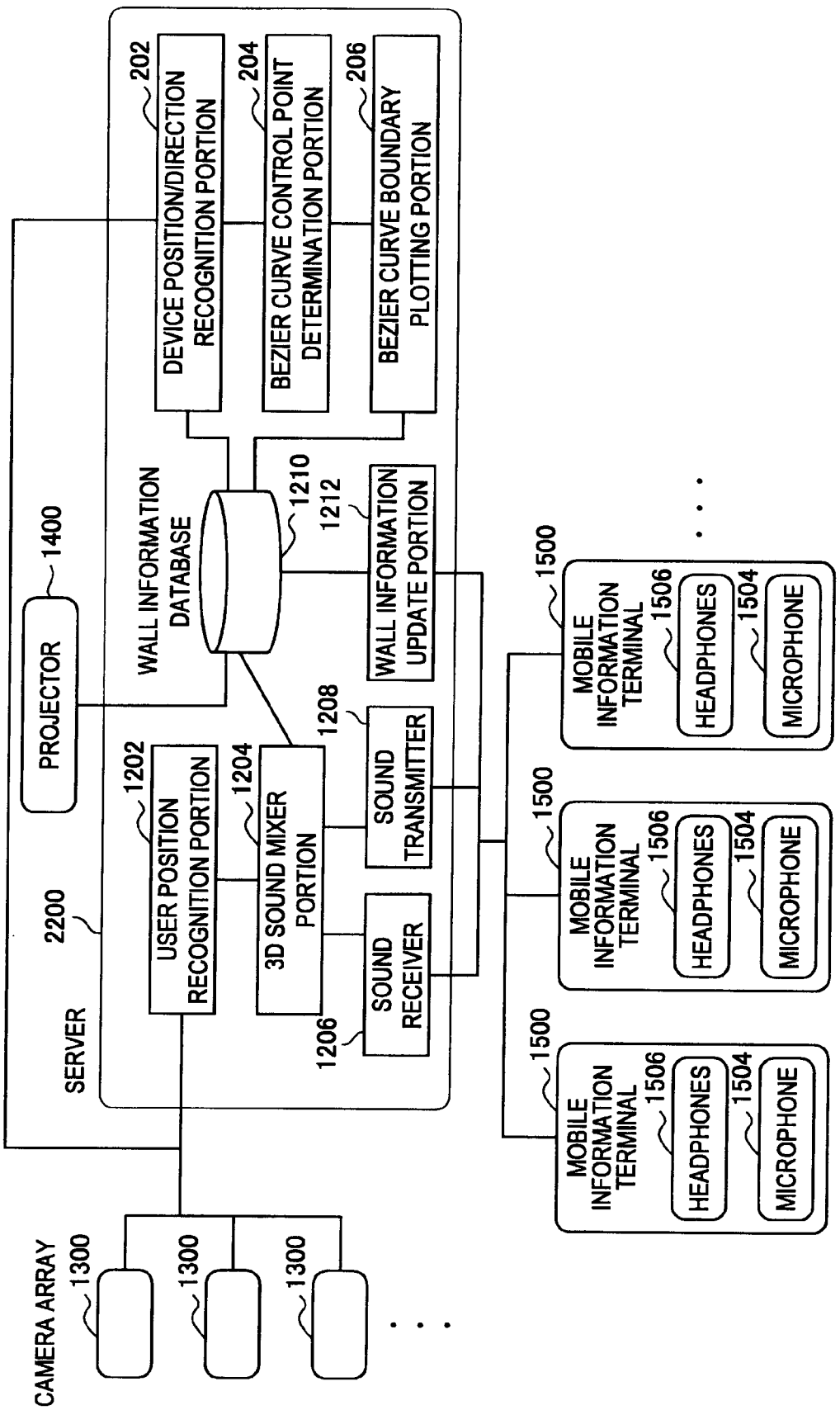
FIG. 18 is a schematic diagram showing the function block structure of a function control system 2100 with the server at the center, according to the fourth embodiment.

(2) Function Block Structure of Sound Field Boundary Definition System Using Boundary Definition with Server at Center In the fourth embodiment, the only point of difference with the third embodiment is the structure in which the disc shaped devices 500 are used to set the virtual wall 10. In other respects, the structure of the fourth embodiment is the same as that of the third embodiment. FIG. 18 is a schematic diagram showing the function block structure of the sound field boundary definition system 2100 with a server 2200 at the center, according to the fourth embodiment. Similarly to the server 1200 of the third embodiment, the server 2200 according to the fourth embodiment includes the user position recognition portion 1202, the 3D sound mixer portion 1204, the sound receiver 1206, the sound transmitter 1208, the wall information database 1210 and the wall information update portion 1212. Furthermore, in the fourth embodiment, the server 2200 includes the device position/direction recognition portion 202, the Bezier curve control point determination portion 204, and the Bezier curve boundary plotting portion 206 of the server 200 of the first embodiment. The functions of these structural elements are the same as those of the server 1200 of the third embodiment and of the server 200 of the first embodiment.

Similarly to the first embodiment, based on the positions of the infrared light emitting diodes 500*a*, 500*b*, 500*c* and 500*d* of the disc shaped devices 500 transmitted from the infrared cameras 1300, the device position/direction recognition portion 202 reads the position and the direction of each of the disc shaped devices 500. From the position and the direction of each of the disc shaped devices 500, the Bezier curve control point determination portion 204 determines the control points to define the Bezier curve. The determination of the control points is performed using the technique described above with reference to FIG. 2. The Bezier curve boundary plotting portion 206 determines the Bezier curve based on the control points determined by the Bezier curve control point determination portion 204. To project the Bezier curve onto the floor surface, the Bezier curve boundary plotting portion 206 transmits the data to the projector 1400. The data of the boundary line formed by the Bezier curve is also transmitted to the wall information database 1210.

In addition, similarly to the third embodiment, the user position recognition portion 1202 recognizes the position and the direction of the position recognition markers 1502 of each of the users. The 3D sound mixer portion 1204 mixes the speech information received by the sound receiver 1206 in accordance with the position of the user from whom the information is transmitted, the position of each of the users to whom the information is transmitted and the direction of the face of each of the users to whom the information is transmitted. The 3D sound mixer portion 1204 then performs settings such that the users positioned on the same side of the virtual wall 10 can converse with each other, and transmits the mixed speech information to the sound transmitter 1208. The sound transmitter 1208 transmits the speech information of each of the users that is transmitted from the 3D sound mixer portion 1204 to the mobile information terminals 1500 of each of the users, such that the users positioned on the same side of the virtual wall 10 can converse with each other. Therefore, in a similar way to the third embodiment, it is possible to realize a desired conversation between the users without actually constructing a physical barrier (wall).

Note that, the processing of the server 2200 according to the fourth embodiment is the same as the processing of the third embodiment as described with reference to FIG. 16. In this case, data of the boundary line formed by the Bezier curve is referred to as the position information of the virtual wall 10 saved in the wall information database 1210.

As described above, according to the present embodiment, by defining the virtual wall 10 using the disc shaped devices 500 and only transmitting speech by the selected user to the users positioned on the same side of the virtual wall 10, sound can be blocked by the virtual wall 10, without actually constructing a physical wall. As a result, in an office space or the like, it is possible to realize a desired space that is partitioned off by the virtual wall 10.

Figure 19:
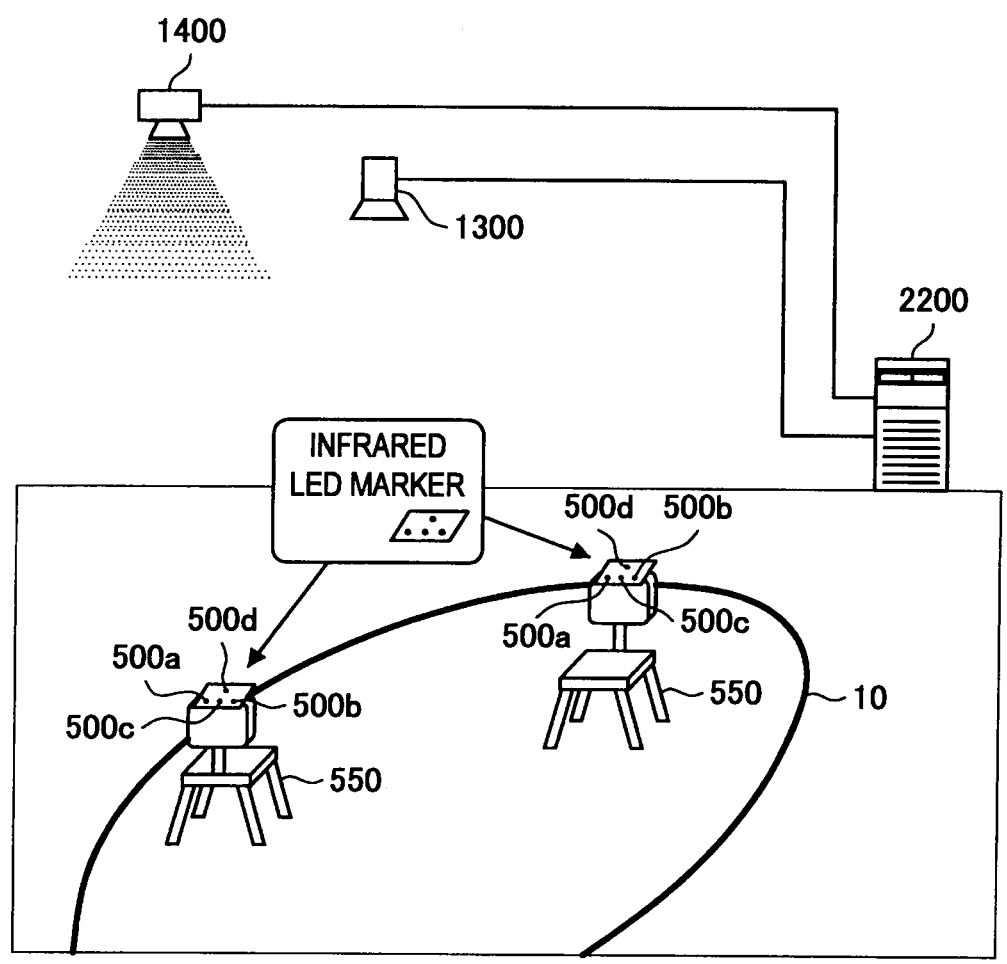
FIG. 19 is a schematic diagram showing the structure of the function control system using boundary definition according to a fifth embodiment of the present invention.

Fifth Embodiment (1) Structure of Sound Field Boundary Definition System Using Boundary Definition According to Fifth Embodiment FIG. 19 is a schematic diagram showing the structure of the function control system 2100 using boundary definition according to a fifth embodiment of the present invention. In place of the disc shaped devices 500 in the fourth embodiment, the fifth embodiment uses physical objects provided with position recognition devices to set a layout of the virtual wall 10 from the position of the physical objects. In the present embodiment, the physical objects are exemplified by chairs 550 that are arranged on the floor surface. The physical objects may be a different structural element, and may be, for example, desks or partitions or the like arranged on the floor surface. The other structural elements of the fifth embodiment are the same as those of the fourth embodiment.

As shown in FIG. 19, the function control system 2100 according to the fifth embodiment includes the server 2200, the infrared camera 1300 and the projector 1400.

Similarly to the disc shaped devices 500, a plurality of infrared light emitting diodes 500a, 500b, 500c and 500d are arranged on an upper surface of the chairs 550 arranged on the floor surface, as the position recognition devices. The infrared camera 1300 photographs the floor surface and acquires an image of the infrared light emitting diodes 500a, 500b, 500c and 500d of each of the chairs 550. The image data acquired by the infrared camera 1300 is transmitted to the server 2200. Then, similarly to the fourth embodiment, the device position/direction recognition portion 202 of the server 2200 reads the position and the direction of each of the chairs 550 based on the positions of the infrared light emitting diodes 500a, 500b, 500c and 500d, and a Bezier curve that forms the virtual wall 10 is determined.

In addition, similarly to the fourth embodiment, the user position recognition portion 1202 of the server 2200 recognizes the position and the direction of the position recognition markers 1502 of each of the users. The 3D sound mixer portion 1204 mixes the speech information received by the sound receiver 1206 in accordance with the position of the user from whom the speech information is transmitted, the position of each of the users to whom the speech information is transmitted and the direction of the face of each of the users to whom the speech information is transmitted. Then, the 3D sound mixer portion 1204 performs settings such that the users positioned on the same side (the inside) of the virtual wall 10 can converse with each other, and transmits the mixed speech information to the sound transmitter 1208. The sound transmitter 1208 transmits the speech information to be sent to each of the users transmitted from the 3D sound mixer portion 1204, to the mobile information terminals 1500 of each of the users such that the users positioned on the same side (the inside) of the virtual wall 10 can converse with each other. Therefore, similarly to the fourth embodiment, it is possible to realize a desired conversation between the users without actually constructing a physical barrier (wall).

FIG. 20 is a schematic diagram showing a state in which the virtual wall 10 is set when five of the chairs 550 are arranged facing each other. As shown in FIG. 20A, the five chairs 550 are arranged facing a certain center. In this case, each person sits facing each other as shown in FIG. 20B. Then, as shown in FIG. 20C, the Bezier curve that forms the virtual wall 10 is set to encompass each of the chairs 550. As a result, the five people sitting in the chairs 550 can conduct a conversation. On the other hand, people wearing the mobile information terminal 1500 who are not sitting on the chairs 550 are outside the virtual wall 10 and cannot converse with the five people sitting on the chairs 550.

Figure 21A:
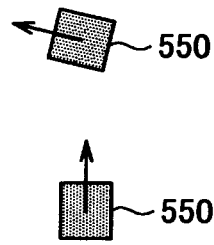
FIG. 21 is a series of schematic diagrams showing cases in which the chairs are not arranged facing each other.
Figure 21B:
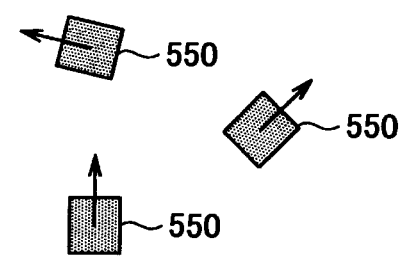

FIG. 21 shows cases in which the chairs 550 are not arranged facing each other. FIG. 21A shows a case in which there are two of the chairs 550 and FIG. 21B shows a case in which there are three of the chairs 550. Based on the positions of the infrared light emitting diodes 500a, 500b, 500c and 500d detected by the device position/direction recognition portion 202, the Bezier curve control point determination portion 204 determines whether or not the chairs 550 are arranged facing each other. When the chairs 550 are not arranged facing each other, a Bezier curve is not set. Therefore, in the type of case shown in FIG. 21A and FIG. 21B, the virtual wall 10 is not set.

Figure 22:
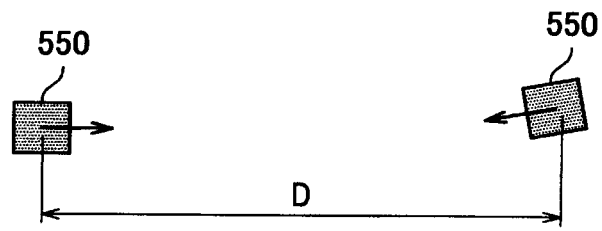
FIG. 22 is a schematic diagram showing a case in which the chairs arranged facing each other are placed at a distance from each other.

In addition, FIG. 22 shows a case in which the chairs 550 arranged facing each other are placed at a distance from each other. Based on the positions of the infrared light emitting diodes 500a, 500b, 500c and 500d detected by the device position/direction recognition portion 202, the Bezier curve control point determination portion 204 does not set a Bezier curve when the distance between the chairs 550 is greater than a predetermined value D. Therefore, when the chairs 550 arranged facing each other are placed far apart, the virtual wall 10 is not set.

Figure 23A:
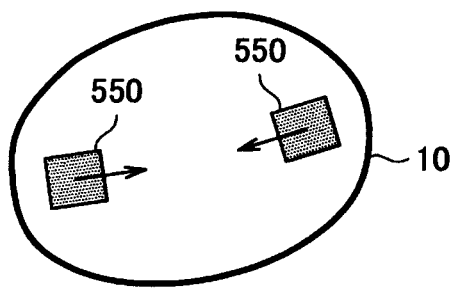
FIG. 23 is a schematic diagram showing a state in which a virtual wall is established when the chairs are arranged facing each other and a distance between each of the chairs is equal to or less than a predetermined value.
Figure 23B:
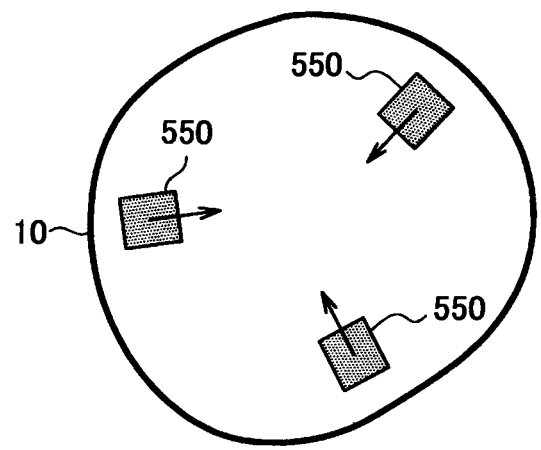

As a result, as shown in FIG. 23, when the chairs 550 are arranged facing each other and the distance between each of the chairs 550 is equal to or less than the predetermined value D, the virtual wall 10 is set. In this way, only when the people sitting in the chairs 550 are facing each other, and each person sitting in the chairs 550 are at a close distance to each other, it is possible to conduct a conversation inside the virtual wall 10 that is set such that it encompasses each of the chairs 550.

As described above, according to the present embodiment, the virtual wall 10 is defined by the chairs 550, and speech by a selected user is transmitted only to other users positioned inside the virtual wall 10 that is set such that it encompasses each of the chairs 550. In this way, sound can be blocked by the virtual wall 10 without actually constructing a physical wall. As a result, in an office space or the like, it is possible to realize a desired space partitioned off by the virtual wall 10 that is set in accordance with the arrangement of the chairs 550.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-83101 filed in the Japan Patent Office on 30 Mar. 2009, Japanese Priority Patent Application JP 2009-1153 filed in the Japan Patent Office on 6 Jan. 2009 and Japanese Priority Patent Application JP 2009-1154 filed in the Japan Patent Office on 6 Jan. 2009, the entire content of which is hereby incorporated by reference.

What is claimed is:

1. A function control method using boundary definition, comprising the steps of:
   setting a boundary line to virtually partition a given physical space using a respective position and direction of a plurality of position recognition devices; and
   controlling a predetermined function of an electronic appliance within the given physical space based on a position of the electronic appliance and at least one of a position of the boundary line, and a shape and a size of a closed loop formed by the boundary line.

2. The function control method using boundary definition according to claim 1, wherein
   the step of setting the boundary line includes the steps of
      acquiring the positions of the plurality of position recognition devices arranged in the given physical space, and
      calculating, based on the position of the plurality of position recognition devices, the boundary line linking the position recognition devices.

3. The function control method using boundary definition according to claim 2, wherein
   the directions of the plurality of position recognition devices are acquired along with the positions of the plurality of position recognition devices, in the step of acquiring the position of the position recognition devices, and
   a three dimensional Bezier curve is calculated based on the position and the direction of the position recognition devices, in the step of calculating the boundary line.

4. The function control method using boundary definition according to claim 1, wherein
   a function that is realized by the electronic appliance is controlled in accordance with a positional relationship between the position of the boundary line and the electronic appliance that is operated by a user, in the step of controlling the predetermined function.

5. The function control method using boundary definition according to claim 1, further comprising the step of:
   displaying the boundary line in the given physical space.

6. The function control method using boundary definition according to claim 5, wherein
   the step of displaying includes the step of displaying the boundary line forming a closed loop along with displaying a function by a predetermined application within the closed loop, and
   based on one of the shape and the size of the closed loop, the function of the application displayed within the closed loop is controlled, in the step of controlling the predetermined function.

7. A function control method using boundary definition, comprising the steps of:
   setting a boundary line to virtually partition a given physical space; and
   controlling a predetermined function of an electronic appliance within the given physical space based on a position of the electronic appliance and at least one of a position of the boundary line, and a shape and a size of a closed loop formed by the boundary line;
   acquiring sound information emitted within the given physical space;
   determining a position from which the sound information is obtained;
   acquiring a position of the electronic appliance within the given physical space; and
   transmitting the sound information to the electronic appliance when position of the electronic appliance is on a same side of a boundary formed by the boundary line as the position at which the sound information is obtained;
   wherein the electronic appliance is a mobile information terminal.

8. The function control method using boundary definition according to claim 7, wherein
   the mobile information terminal is worn by a user who is present in the given physical space, and the mobile information terminal plays back and provides sound formed by the sound information to the user.

9. The function control method using boundary definition according to claim 7, further comprising the step of:
   performing 3D mixing on the sound information before the step of transmitting the sound information, the 3D mixing being performed based on a position at which the sound information is acquired and a position of the mobile information terminal to which the sound information is transmitted;
   wherein
   the step of transmitting the sound information includes the step of transmitting the sound information on which 3D mixing has been performed.

10. The function control method using boundary definition according to claim 7, wherein the sound information is acquired by a microphone provided in the mobile information terminal.

11. The function control method using boundary definition according to claim 1, wherein
the position recognition devices are provided in physical objects that are arranged within the given physical space.

12. A function control system using a boundary definition, comprising:
an electronic appliance within a given physical space with a controllable predetermined function; and
a function control server that includes
a boundary line setting portion that sets a boundary line to virtually partition the given physical space using a respective position and direction of a plurality of position recognition devices, and
a function control portion that controls the predetermined function of the electronic appliance based on a position of the electronic appliance and at least one of a position of the boundary line, and a shape or a size of a closed loop formed by the boundary line.

13. A function control server using a boundary definition, comprising:
a boundary line setting portion that sets a boundary line to virtually partition a given physical space using a respective position and direction of a plurality of position recognition devices; and
a function control portion that controls a predetermined function of an electronic appliance within the given physical space based on a position of the electronic appliance and at least one of a position of the boundary line, and a shape or a size of a closed loop formed by the boundary line.

14. A non-transitory computer readable medium containing a program comprising instructions that command a computer to function as:
a boundary line setting device that sets a boundary line to virtually partition a given physical space using a respective position and direction of a plurality of position recognition devices; and
a device to control a predetermined function of an electronic appliance within the given physical space, based on a position of the electronic appliance and at least one of a position of the boundary line and a shape or a size of a closed loop that is formed by the boundary line.

15. A function control system using boundary definition, comprising:
a first mobile information terminal that is present in a given physical space and that transmits and receives sound information by wireless communication; and
a sound field boundary definition server that includes
a database that stores boundary information used to virtually partition the given physical space,
a sound receiver that acquires sound information transmitted from the first mobile information terminal,
a position recognition portion that acquires a position of the first mobile information terminal, and
a sound transmitter that transmits the acquired sound information to a second mobile information terminal that is present on a same side of a boundary formed by the boundary information as the first mobile information terminal that acquires the sound information.

16. A function control server using boundary definition, comprising:
a database that stores boundary information to virtually partition a given physical space;
a sound receiver that acquires sound information emitted within the given physical space;
a position recognition portion that acquires a position of a mobile information terminal present within the given physical space; and
a sound transmitter that transmits the sound information to the mobile information terminal that is present on a same side of a boundary formed by the boundary information as a position at which the sound information is acquired.

17. A non-transitory computer readable medium containing a program comprising instructions that command a computer to function as:
a device that stores boundary information to virtually partition a given physical space;
a device that acquires sound information emitted within the given physical space;
a device that acquires a position of a mobile information terminal that is present within the given physical space; and
a device that transmits the sound information to the mobile information terminal when the mobile terminal is present on a same side of a boundary formed by the boundary information as a position at which the sound information is obtained.

* * * * *